US012625358B2

(12) United States Patent
Springer et al.

(10) Patent No.: US 12,625,358 B2
(45) Date of Patent: May 12, 2026

(54) METHOD COMPRISING DETERMINING A QUANTITATIVE DISPERSION IMAGE OF AN OBJECT AND DIGITAL IN-LINE HOLOGRAM MICROSCOPE SCANNER

(71) Applicant: Sony Group Corporation, Tokyo (JP)

(72) Inventors: Paul Springer, Stuttgart (DE); Thimo Emmerich, Stuttgart (DE); Zoltan Facius, Stuttgart (DE); Matthias Schinzel, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 648 days.

(21) Appl. No.: 18/014,175

(22) PCT Filed: Jul. 9, 2021

(86) PCT No.: PCT/EP2021/069187
§ 371 (c)(1),
(2) Date: Jan. 3, 2023

(87) PCT Pub. No.: WO2022/008726
PCT Pub. Date: Jan. 13, 2022

(65) Prior Publication Data
US 2023/0258917 A1 Aug. 17, 2023

(30) Foreign Application Priority Data
Jul. 10, 2020 (EP) .................................... 20185349

(51) Int. Cl.
*G02B 21/00* (2006.01)
*G02B 21/36* (2006.01)
*G03H 1/22* (2006.01)

(52) U.S. Cl.
CPC ....... *G02B 21/008* (2013.01); *G02B 21/0032* (2013.01); *G02B 21/0052* (2013.01);
(Continued)

(58) Field of Classification Search
CPC .............. G02B 21/008; G02B 21/0032; G02B 21/0052; G02B 21/36; G02B 21/365;
(Continued)

(56) References Cited

U.S. PATENT DOCUMENTS

2013/0286400 A1* 10/2013 Kim .......................... G01B 9/04
356/450
2014/0221813 A1 8/2014 Bryant-Greenwood et al.
(Continued)

FOREIGN PATENT DOCUMENTS

CN          103411690 A      11/2013

OTHER PUBLICATIONS

International Search Report and Written Opinion mailed on Oct. 18, 2021, received for PCT Application PCT/EP2021/069187, filed on Jul. 9, 2021, 8 pages.
(Continued)

*Primary Examiner* — Mustak Choudhury
(74) *Attorney, Agent, or Firm* — XSENSUS LLP

(57) ABSTRACT
A method comprising determining a quantitative dispersion image of an object based on a set of quantitative phase images, each quantitative phase image of the set of quantitative phase images having been obtained with a respective different illumination light wavelength.

24 Claims, 15 Drawing Sheets

(52) U.S. Cl.
CPC ........... G02B 21/36 (2013.01); G03H 1/2202 (2013.01); G03H 1/2286 (2013.01)

(58) Field of Classification Search
CPC .......... G02B 21/14; G06N 3/044; G06N 3/08; G01N 21/453; G03H 1/0866; G03H 1/2202; G03H 1/2286; G03H 2001/266; G03H 2223/26; G03H 2240/54; G03H 1/0443; G03H 2001/005; G03H 2001/0447; G03H 2001/0458; G06V 10/143; G06F 18/24
See application file for complete search history.

(56) References Cited

U.S. PATENT DOCUMENTS

| | | | |
|---|---|---|---|
| 2014/0375792 A1* | 12/2014 | Yaqoob | G01N 21/453 |
| | | | 348/79 |
| 2017/0115557 A1* | 4/2017 | Peters | G01N 21/33 |
| 2017/0357083 A1 | 12/2017 | Ozcan et al. | |
| 2019/0137932 A1 | 5/2019 | Ozcan et al. | |
| 2019/0286053 A1 | 9/2019 | Ozcan et al. | |
| 2019/0294108 A1 | 9/2019 | Ozcan et al. | |

OTHER PUBLICATIONS

Khan et al., "A Nonlinear Mapping Approach to Stain Normalization in Digital Histopathology Images Using Image-Specific Color Deconvolution", IEEE Transactions on Biomedical Engineering, vol. 61, No. 6, Jun. 2014, pp. 1729-1738.

Jin Hongxia et al.: "Analysis of the influencing factors on reconstruction image of digital holograms", Laser and Infrared, Oct. 20, 2009, pp. 1104-1107.

* cited by examiner

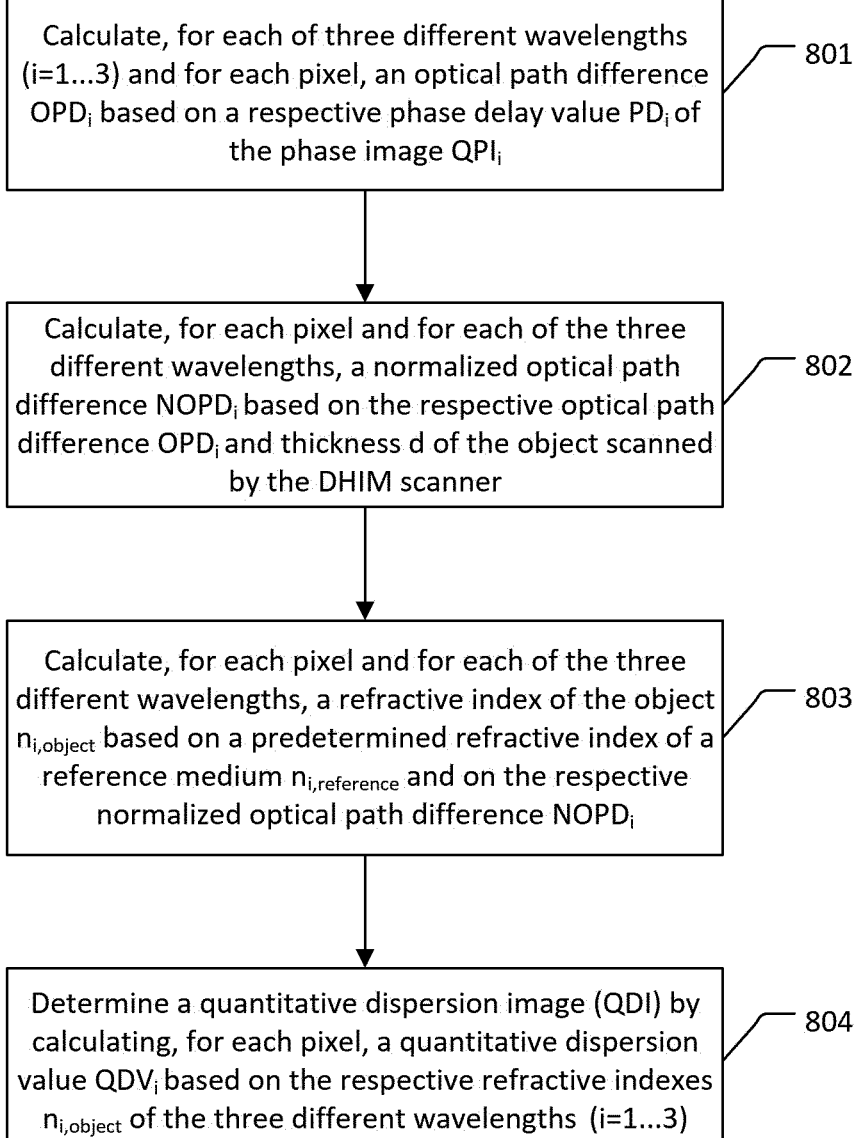

Calculate, for each of three different wavelengths $(i=1...3)$ and for each pixel, an optical path difference $OPD_i$ based on a respective phase delay value $PD_i$ of the phase image $QPI_i$    801

Calculate, for each pixel and for each of the three different wavelengths, a normalized optical path difference $NOPD_i$ based on the respective optical path difference $OPD_i$ and thickness d of the object scanned by the DHIM scanner    802

Calculate, for each pixel and for each of the three different wavelengths, a refractive index of the object $n_{i,object}$ based on a predetermined refractive index of a reference medium $n_{i,reference}$ and on the respective normalized optical path difference $NOPD_i$    803

Determine a quantitative dispersion image (QDI) by calculating, for each pixel, a quantitative dispersion value $QDV_i$ based on the respective refractive indexes $n_{i,object}$ of the three different wavelengths $(i=1...3)$    804

Fig. 8

Perform classification of stained or unstained object based on trained classifier and color image of stained or unstained object and/or QDI of stained or unstained object and/or QPIs of stained or unstained object — 1001

Perform virtual staining of stained or unstained object based on classification of stained or unstained object and look-up-table — 1002

| Value of QDI pixel | Classification |
|---|---|
| [0.1, 0.2] | Hematoxylin |
| [0.5,0.8] | Eosin |
| other | none |

METHOD COMPRISING DETERMINING A QUANTITATIVE DISPERSION IMAGE OF AN OBJECT AND DIGITAL IN-LINE HOLOGRAM MICROSCOPE SCANNER

CROSS-REFERENCE TO RELATED APPLICATIONS

The present application is based on PCT filing PCT/EP2021/069187, filed Jul. 9, 2021, which claims priorities to EP 20185349.6, filed on Jul. 10, 2020, the entire contents of each are incorporated herein by reference.

TECHNICAL FIELD

The present disclosure generally pertains to the field of holographic microscopy, in particular to devices, methods and systems for time-sequential partially coherent illumination based holographic microscopy scanners.

TECHNICAL BACKGROUND

In the field of digital pathology imaging automatic analysis of tissue specimen is facilitated by applying image acquisition under brightfield condition using an RGB scanner. Sufficient imaging contrast is needed in order to make it possible to digitize a thin sliced tissue specimen by the use of a visible light RGB scanner. This is achieved by staining (labeling) the specimen with a histochemical dye, whereby sufficient imaging contrast is provided to make it possible to use the visible light RGB scanner. Thereby, the specimen is transformed from, a phase-altering object (only phase of transmitted light changes, not the amplitude) into an amplitude-altering object. Frequently used histochemical dyes are Hematoxylin and Eosin (HE), which create the desired imaging contrast and reveal tissue morphology on the cellular and the subcellular level.

However, the staining process suffers from several disadvantages, which especially make automated image analysis difficult, for example image analysis based on machine learning. For example, the digitized tissue specimen can show a huge variability in the appearance of the histochemical dye caused by different lab protocols (e.g. leading to different application time of HE) or caused by different chemical formulation of reagents among different labs or caused by different specimen thickness. Another disadvantage can be that the staining process is time consuming, especially if additional staining is required. Still another disadvantage can be the staining process is expensive if non-common reagents are necessary. Still another disadvantage can be that the chemical effects deform structures of the specimen.

Therefore, a technique known as virtual staining can be applied to an object which overcome some of the above-mentioned disadvantages. In virtual staining of an object, a digital representation that is equivalent to a chemically stained version of the object is created and thereby histochemical staining can be avoided. Therefore, it is desirable to improve the virtual staining technique.

SUMMARY

According to a first aspect the disclosure provides a method comprising determining a quantitative dispersion image of an object based on a set of quantitative phase images, each quantitative phase image of the set of quantitative phase images having been obtained with a respective different illumination light wavelength.

According to a further aspect the disclosure provides an electronic device comprising circuitry configured to acquiring with at least three different illumination light wavelengths respectively one or more phase-shifted holograms of an object at an image sensor.

According to a further aspect the disclosure provides a digital in-line hologram microscope scanner comprising, an image sensor configured to acquire, for each illumination light wavelength of a set of different illumination light wavelengths, respective two or more phase-shifted holograms of an object.

Further aspects are set forth in the dependent claims, the following description and the drawings.

BRIEF DESCRIPTION OF THE DRAWINGS

Embodiments are explained by way of example with respect to the accompanying drawings, in which:

FIG. 8 shows a flow chart of the calculation of the quantitative dispersion image (QDI);

FIG. 10b shows a table of QDI pixel values and their corresponding classification;

DETAILED DESCRIPTION OF EMBODIMENTS

Figure 1:
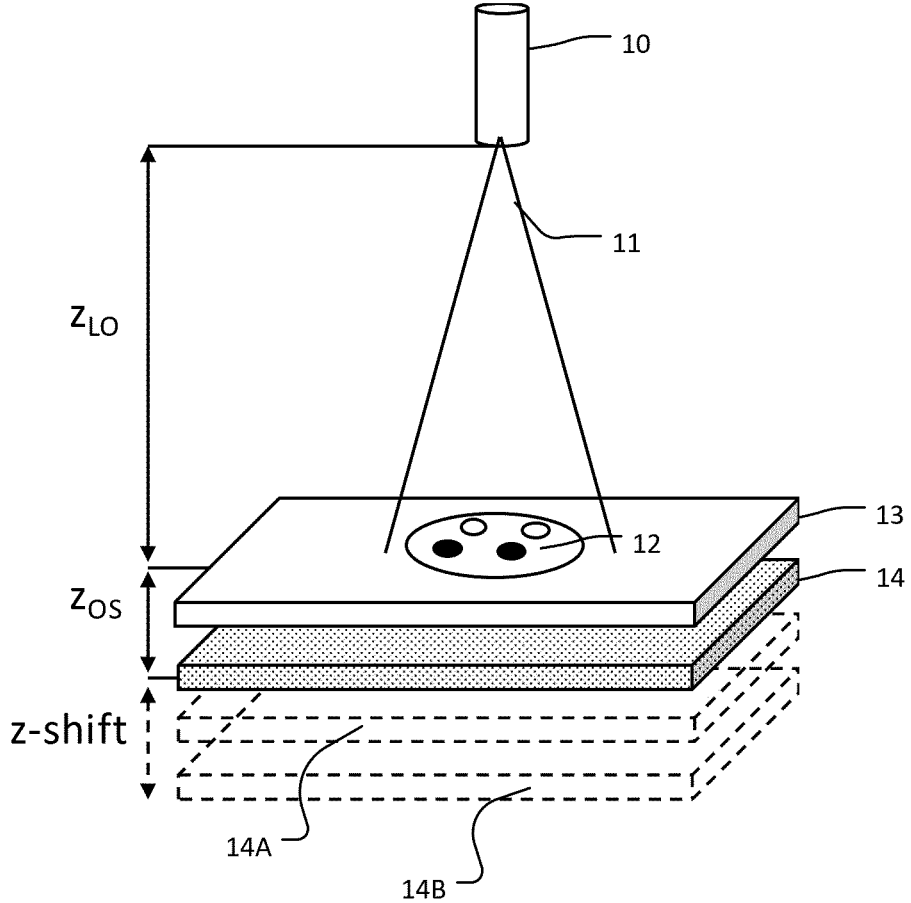
FIG. 1 shows a digital-in-line holographic microscopy (DIHM) scanner with a multi-height phase shift concept.

Before a detailed description of the embodiments under reference of FIG. 1, general explanations are made.

The embodiments described below in more detail disclose a method comprising determining a quantitative dispersion image of an object based on a set of quantitative phase images, each quantitative phase image of the set of quantitative phase images having been obtained with a respective different illumination light wavelength.

A set of quantitative phase images may be one or more quantitative phase images.

A two-dimensional image of an object may for example assign an intensity value to each pixel representing the grey-scale value of the pixel (or intensity values for each colour may be assigned to each pixel). That means, a two-dimensional image may be described through a two-dimensional real-valued function. The Fourier transform of the two-dimensional real-valued function of the image may yield a phase value and an amplitude (or sometimes called magnitude) value for each pixel, which may be called (quantitative) phase image of the object and amplitude image of the object. As described below the quantitative phase image of an object and an amplitude image of an object may be obtained by using a digital hologram scanner.

A hologram scanner illuminates an object with illumination light and captures an interference pattern of the illumination light wave that was scattered by the object with the illumination light wave that was non-scattered. An illumination light for a hologram scanner can use the illumination light of a laser.

According to some embodiment the method may further comprise calculating, for each different illumination light wavelength, the respective phase image based on respective one or more phase-shifted holograms of the object.

According to some embodiment the method may further comprise acquiring, for each different illumination light wavelength, respectively one or more phase-shifted holograms of an object at an image sensor.

According to some embodiment the determining of a quantitative dispersion image (QDI) of the object may comprise calculating, for each of different illumination light wavelengths and for each pixel of the quantitative dispersion image (QDI), an optical path difference based on a phase delay value of a respective pixel of the respective quantitative phase image.

The value that is stored by each pixel of a quantitative phase image may be called phase delay value.

According to some embodiment the determining a quantitative dispersion image (QDI) of the object may comprise calculating, for each of different illumination light wavelength and for each pixel of the quantitative dispersion image (QDI), a refractive index based on a predetermined refractive index of a reference medium and the optical path difference of a respective pixel of the respective quantitative phase image.

A reference medium may for example be a special kind of glass, air, water or a special crystal.

According to some embodiment the determining of the quantitative dispersion image (QDI) of the object may comprise calculating, for each pixel of the quantitative dispersion image (QDI), a quantitative dispersion value based on the respective refractive indices of the different illumination light wavelengths.

Each pixel of a colour image, or a quantitative phase image or an amplitude image of an object may represent the colour, phase or amplitude value of a specific $\lambda$red of the object that is captured by the pixel. Each $\lambda$red of the object, represented by a pixel value (colour, amplitude, phase) may have another refractive index depending on the wavelength of the illumination light that it was illuminated with while recording the hologram.

According to some embodiment the set of quantitative phase images may comprise three quantitative phase images, wherein each of the three quantitative phase images having been obtained with one of three different illumination light wavelengths ($\lambda_{short}$, $\lambda_{middle}$, $\lambda_{long}$) which are ordered as $\lambda_{short} < \lambda_{middle} < \lambda_{long}$ wherein $\lambda_{short}$ is the shortest wavelength of the three different wavelength, $\lambda_{middle}$ is the middle wavelength of the three different wavelength and $\lambda_{long}$ is the longest wavelength of the three different wavelength.

For example, the longest wavelength of the three different illumination light wavelengths $\lambda_{long}$ may be red, for example $\lambda_{long}$=640 nm. For example, the middle of the three different illumination light wavelengths $\lambda_{middle}$ may be green, for example $\lambda_{middle}$=530 nm. For example, the shortest of the three different illumination light wavelengths $\lambda_{short}$ may be blue, for example $\lambda_{short}$=450 nm. According to some embodiment the determining a of quantitative dispersion image (QDI) of the object may comprise calculating, for each pixel of the quantitative dispersion image (QDI), a quantitative dispersion value (QDV), based on the three refractive indices corresponding to the three different illumination light wavelengths ($\lambda_{short}$, $\lambda_{middle}$, $\lambda_{long}$), wherein the first, refractive index $n_{short}$ corresponds to shortest illumination light wavelength $\lambda_{short}$, the second refractive index $n_{middle}$ corresponds to middle illumination light wavelength $\lambda_{middle}$ and the third refractive index $n_{long}$ corresponds to the longest illumination light wavelength $\lambda_{long}$.

A refractive index corresponding to an illumination light wavelength may be meaning that the refractive index was calculated based on a data derived from a hologram which was captured using illumination light with the wavelength.

According to some embodiment a virtual staining of the object, may be based on the quantitative dispersion image of the object.

According to some embodiment the method may comprise, determining a quantitative phase image (QPI) of the object for each three different illumination light wavelengths by applying a Gerchberg-Saxton algorithm to the respective one or more phase-shifted holograms of the object for each three different illumination light wavelengths.

According to some embodiment the three different illumination light wavelengths may be red, green and blue.

The wavelength for red green and blue may be for example $\lambda_{red}$=640 nm, $\lambda_{green}$=530 nm, $\lambda_{blue}$=450 nm.

According to some embodiment the method may comprise calculating, for each different illumination light wavelength, a respective amplitude image based on respective one or more phase-shifted holograms of the object, and reconstructing an RGB image of the object based on the amplitude images.

According to some embodiment the virtual staining of the object may be based on the quantitative dispersion image (QDI) of the object and/or the RGB image of the object and/or the quantitative phase image (QPI) for each of the three different illumination light wavelengths.

Virtual staining of an object may simulate the result for each pixel of a colour image the object as if the object was dyed with a certain chemical dye. This simulation result may be done with the help of a classification algorithm. This classification algorithm may be trained with labelled inputs (in the meaning of supervised learning) of colour images of objects and/or of QPIs of objects and/or of QDIs of objects. The simulation, with help of the trained classifier, may then map a colour image of an object and/or the QPIs for each of the three different illumination light wavelengths of an object and/or the QDI of an object to a virtual stained image of the object.

According to some embodiment respective one or more phase-shifted holograms of the object may be acquired time sequentially for each of the different illumination light wavelength and wherein the image sensor is a monochrome image sensor.

A hologram may be captured by illuminating an object with coherent laser light with a specific wavelength. Time sequentially may mean that the different holograms, captured with different illumination light wavelength may be captured one after the other at different time steps, wherein the coherent laser light has changed its wavelength at the different time steps.

According to some embodiment the acquiring of two or more phase-shifted holograms of the object may comprise shifting the distance between the image sensor and the object to realize different phase shifts.

According to some embodiment the acquiring of two or more phase-shifted holograms of the object may comprise tuning a tunable phase-shifter which is placed between the object and the image sensor to realize different phase shifts.

According to some embodiment the acquiring of two or more phase-shifted holograms of the object may comprise inserting different swappable elements with different refractive indices between the image sensor and the object to realize different phase shifts.

According to some embodiment the acquiring of two or more phase-shifted holograms of the object may comprise switching a polarizer place on top of a birefringent optical element which are placed between the object and the image sensor to realize different phase shifts.

According to some embodiment the object may be a tissue specimen.

The embodiments described below in more detail discloses an electronic device that may comprise circuitry configured to acquiring with at least three different illumination light wavelengths respectively two or more phase-shifted holograms of an object at an image sensor.

Circuitry may include a processor, a memory (RAM, ROM or the like), a DNN unit, a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.).

The embodiments described below in more detail discloses a digital in-line holography microscope scanner that may comprise, an image sensor configured to acquire, for each, illumination light wavelength of a set of different illumination light wavelengths, respective two or more phase-shifted holograms of an object, wherein the distance between the object and the image sensor is fixed.

According to some embodiment the digital-in-line holography microscope scanner may further comprise a tunable phase-shifter placed between the image sensor and the object, configured to adjust the phase of emitted light, for acquiring the two or more phase-shifted holograms of the object.

According to some embodiment the digital in-line holography microscope scanner may further comprise different swappable optical elements with different refractive indices placeable between the image sensor and the object, for, acquiring the two or more phase-shifted holograms of the object.

According to some embodiment the digital in-line holography microscope scanner may further comprise a switchable polarizer and, a birefringent optical element placed between the image sensor and the object, configured to switch the polarizer for acquiring the two or more phase-shifted holograms of the object.

Embodiments are now described by reference to the drawings.

The computational imaging system described below is applied in the field of digital pathology imaging (DPI) and is used in order to, create a colour image of an object, for example a tissue specimen, and transform this image into one or more virtually stained colour images of the same tissue specimen. The main advantages this virtual staining approach is that the variability of digitized objects (for example tissue specimens) is reduced because the application of a chemical dye with different laboratory protocols (e.g. leading to different application time of the chemical dye) is avoided, or because the application of a chemical dye with different chemical formulation of reagents among different laboratories is avoided. A further advantage is the reduction of overall time due to the removal of the chemical staining, process (especially if additional staining is required). Still another advantage is the reduction of the overall cost due to removal of staining process (especially expensive if non-common reagents are necessary). Another advantage is the reduction of the deformation of object (for example a tissue specimen) structure due to the removal of staining, which leads to an improved diagnosis.

Realization of a Phase Shift in a Digital in-Line Holographic Microscopy (DIHM) Scanner FIG. 1 schematically shows a digital in-line holographic microscopy (DIHM) scanner in which a phase-shift between interference images is realized by changing the object-to-sensor distance. An in-line holography laser 10 sends out partially coherent time sequential illumination light beams 11 at different predefined illumination light wavelengths. An object-plane 13 is located at a distance $z_{LO}$ from the laser 10. Into this object-plane 13 an object 12, for example a tissue specimen, is placed. For each of the different predefined illumination light wavelengths, a monochrome image sensor 14, for example a CMOS or a CCD sensor, captures a respective interference pattern created by superposition of a wave front scattered (also called scattered wave) by the object 12 and an non-scattered wave front (also called reference wave). The non-scattered wave stems from the partially coherent illumination source. The monochrome image sensor 14 is placed at a distance $z_{OS}$ from the object-plane 13 in which the object 12 is located. In order to capture different interference patterns with different phase shifts, the monochrome image sensor 14 is shifted in the z-direction by an amount z-shift by an actuator such as a servomotor (not shown in FIG. 1) and is thus placed at specified positions 14A and 14B. Accordingly, the distance $z_{OS}$ between the image sensor 14 and the object-plane 13 is altered and different interference patterns can be recorded at the monochrome image sensor 14 with respective phase shifts.

This setup, where the laser 10 sends its beams 11 directly through to object 12 onto the monochrome image sensor 14 where the interference pattern is captured, is, called digital in-line holography. It has to be noted that, in this setup (FIG. 1 to FIG. 4) no lens (lens-free) is used. In this case a pinhole may be added on the illumination side. The interference pattern is also called "hologram" (or "intensity image plan"), wherein each hologram encodes amplitude and phase information of the object 12. In order to realize a proper illumination an aperture may be added to the configuration.

The DIHM scanner of FIG. 1 may for example be configured to establish a distance $z_{LO}$=5 cm between the laser and the object plane and to perform a partially coherent time-sequential illumination with three different wavelengths $\lambda_{red}$=640 nm, $\lambda_{green}$=530 nm and $\lambda_{blue}$=450 nm and with two different phase shifts per wavelength. For example, at wavelength $\lambda_{red}$=640 nm, the scanner captures a first interference image with a distance $z_{OS}$=1 mm, and a second interference image at a distance $z_{OS}$=1,015 mm with a z-shift of 15 μm compared to the first interference image. Further, at wavelength $\lambda_{green}$=530 nm, the scanner captures a third interference image with a distance $z_{OS}$=1 mm, and a fourth interference image at a distance $z_{OS}$=1,015 mm with a z-shift of 15 μm compared to the third image. Still further, at wavelength $\lambda_{blue}$=450 nm, the scanner captures a fifth interference image with a distance $z_{OS}$=1 mm, and a sixth interference image at a distance $z_{OS}$=1,015 mm with a z-shift of 15 compared to the fifth image. For each of the wavelengths $\lambda_{red}$, $\lambda_{green}$ and $\lambda_{blue}$ the exemplifying z-shift of 15 μm of the above example results in a respective wavelength-dependent phase shift, namely Frac(15 μm/640 nm)× 360°=157.5° for $\lambda_{red}$=640 nm, Frac(15 μm/530 nm)× 360°=108.7° for $\lambda_{green}$=530 nm, and Frac(15 μm/450 nm)× 360°=120.0° for $\lambda_{blue}$=450 nm, where Frac(x) returns the fraction to the right of the decimal point of real number x. It is required to know the phase shift value (e.g. z-value) in order to propagate the centered plane to shifted plane in the Gerchberg-Saxton algorithm (see below).

Figure 2:
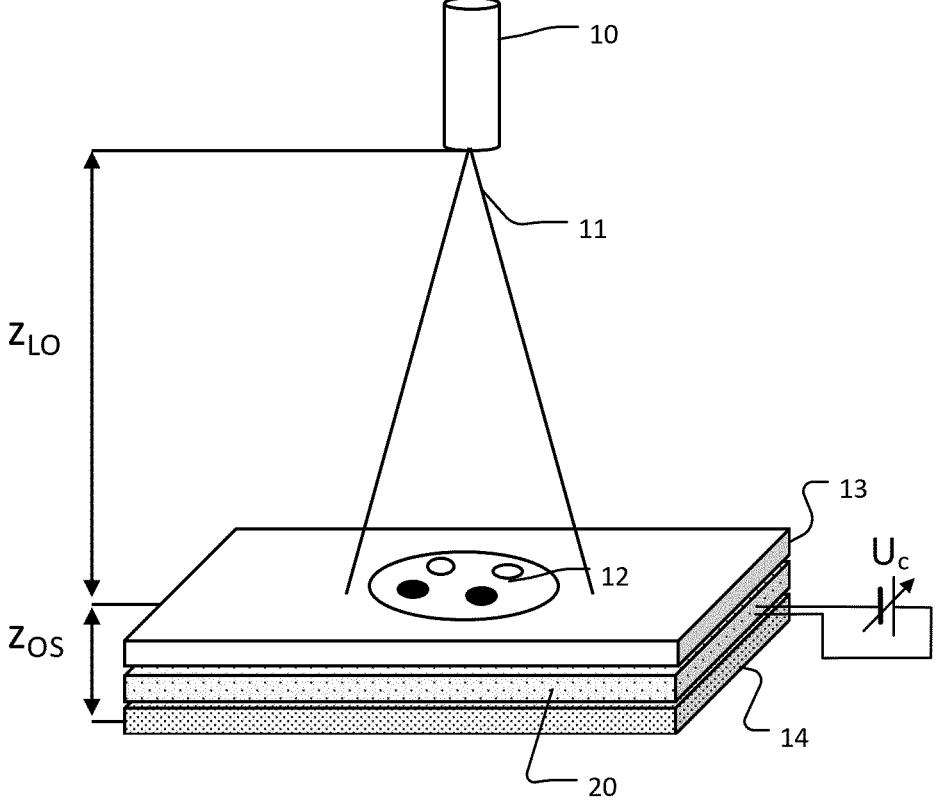
FIG. 2 shows a digital in-line holographic microscopy (DIHM) scanner with a tuneable phase-shifter using a liquid crystal phase shift concept.

FIG. 2 schematically shows a digital in-line holographic microscopy (DIHM) scanner in which a phase-shift between interference images is realized with a tuneable phase-shifter. Similar to the embodiment of FIG. 1, a in-line holography laser 10 sends out partially coherent time sequential illumination light beams 11 at predefined illumination light wavelengths. An object-plane 13 is located at a distance $z_{LO}$ from the in-line holography laser 10, wherein in the plane 12 an object, for example a tissue specimen, is placed. For each of the different predefined illumination light wavelengths, a monochrome image sensor 14, for example a CMOS or a CCD sensor, captures a respective interference pattern created by superposition of a wave front scattered (also called scattered wave) by the object 12 and an non-scattered wave front (also called reference wave). The monochrome image sensor 14 is placed at a distance $z_{OS}$ from the object-plane 13 in which the object 12 is located. In between the image sensor 14 and the object-plane 13 a tuneable phase-shifting liquid crystal filter 20 is placed. In this setup a phase shift between at least two acquisitions of an interference pattern of an object is realized by the tuneable phase shifter 20 using a liquid crystal optical element placed between the object and the sensor. By adjusting a control voltage $U_c$ applied to the phase-shifting liquid crystal filter 20, a phase shift that is exerted on light passing the tuneable phase shifter 2 can be adjusted. For example, any spatial light modulator (transmissive) as described for example by Soheila Kharratian et al in "Advanced Materials and Device Architectures for Magnetooptical Spatial Light Modulators", such as the spatial light modulator LC 2012, may be used.

The DIHM scanner of FIG. 2 may for example be configured to establish a distance $z_{LO}$=5 cm between the laser and the object plane, an object-to-sensor distance $z_{OS}$=1 mm, and may be configured to perform a partially coherent time-sequential illumination with three different wavelengths $\lambda_{red}$=640 nm, $\lambda_{green}$=530 nm and $\lambda_{blue}$=450 nm and with two different phase shifts per wavelength. The tuneable phase-shifting liquid crystal filter 20 may for example be configured to establish a control voltage $U_c$ in the range 0V to 5V. For example, at wavelength $\lambda_{red}$=640 nm, the scanner captures a first interference image with the control voltage $U_c$ set to 1V and a second interference image at a distance with the control voltage $U_c$ set to 2, with a voltage shift of 1V compared to the first interference image. Further, at wavelength $\lambda_{green}$=530 nm, the scanner captures a third interference image with the control voltage $U_c$ set to 1V, and a fourth interference image with the control voltage $U_c$ set to 2V with a voltage shift of 1V compared to the third image.

Still further, at wavelength $\lambda_{blue}$=450 nm, the scanner captures a fifth interference image with the control voltage $U_c$ set to 1V, and a sixth interference image with the control voltage $U_c$ set to 2V with a voltage shift of 1V compared to the fifth image. For each of the wavelengths $\lambda_{red}$, $\lambda_{green}$, and $\lambda_{blue}$ the exemplifying voltage shift of 1V at the tuneable phase-shifting liquid crystal filter 20 of the above example results in a phase shift. For example, the change of the control voltage $U_c$ from 1V to 2V may result in a phase shift of 90° for each of the wavelengths $\lambda_{red}$, $\lambda_{green}$, and $\lambda_{blue}$. In general, a wavelength dependent phase shift can be assumed and a LC response has to be calibrated or measured in order to, propagate correctly for each wavelength.

An advantage of this setup is, that no parts have to be moved inside the apparatus in order to obtain the phase shift and therefore the susceptibility to errors is further reduced.

Figure 3:
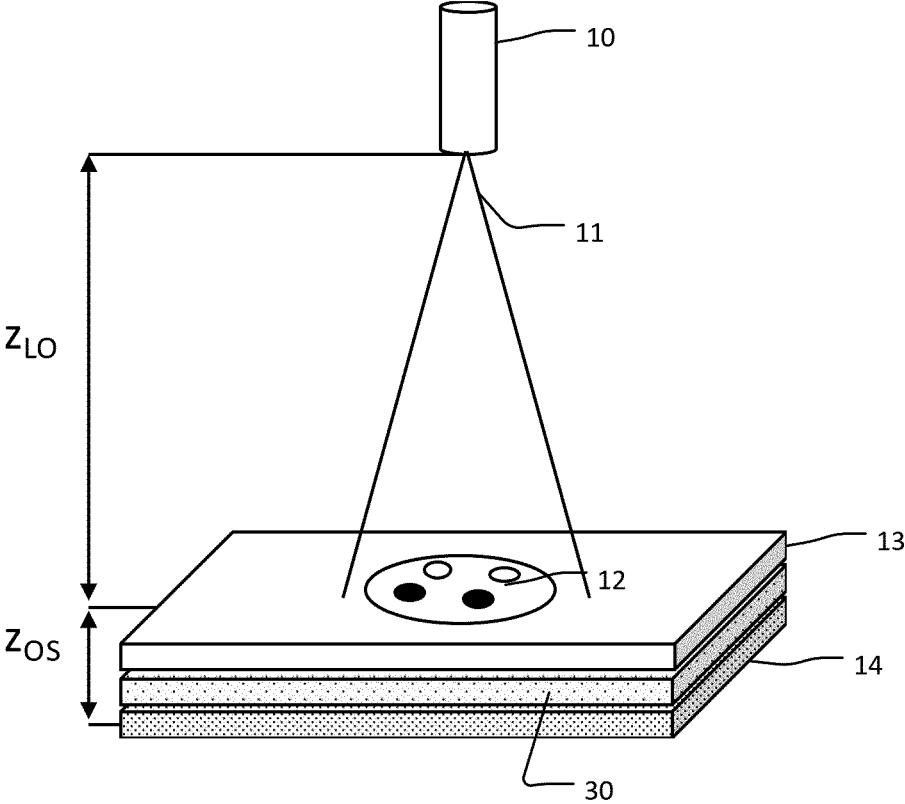
FIG. 3 shows a digital in-line holographic microscopy (DIHM) scanner with different swappable optical elements to realize phase shift concept.

FIG. 3 schematically shows a digital in-line holographic microscopy (DIHM) scanner in which a phase-shift between interference images is realized by inserting optical elements into the light path. Similar to the embodiment of FIGS. 1 and 2, a in-line holography laser 10 sends out partially coherent time sequential illumination light beams 11 at predefined illumination light wavelengths. An object-plane 13 is located at a distance $z_{LO}$ from the in-line holography laser 10, wherein in the plane 12 an object, for example a tissue specimen, is placed. For each of the different predefined illumination light wavelengths, a monochrome image sensor 14, for example a CMOS or a CCD sensor, captures a respective interference pattern created by superposition of a wave front scattered (also called scattered wave) by the object 12 and an non-scattered wave front (also called reference wave). The monochrome image sensor 14 is located at a distance $z_{OS}$ from the object-plane 13 in which the object 12 is located. In between the image sensor 14 and the object-plane 13 different optical elements 30, for example different types of glass with different refractive indices, and/or glass with different thickness, are inserted. In this setup a phase shift between acquisitions of an interference image is realized by inserting different elements between the object and the sensor which exert different phase shifts. A swapping of the elements can for example be done manually or automatically by a revolver swapping device.

The DIHM scanner of FIG. 3 may for example be configured to establish, a distance $z_{LO}$=5 cm between the laser and the object plane, and an object-to-sensor distance $z_{OS}$=1 mm, and may be configured to perform a partially coherent time-sequential illumination with three different wavelengths $\lambda_{red}$=640 nm, $\lambda_{green}$=530 nm and $\lambda_{blue}$=450 nm and with two different phase shifts per wavelength. Further, the DIHM scanner of FIG. 3 may for example be configured to place a borosilicate glass of 1 mm thickness between the image sensor 14 and the object 12 when capturing a first image for each of the wavelengths, and to place additionally a borosilicate glass of 32 μm thickness between the image sensor 14 and the object 12 when capturing a second image for each of the wavelengths. For example, at wavelength $\lambda_{red}$=640 nm, the scanner captures a first interference image a borosilicate glass of 1 mm thickness, and a second interference image with an additional borosilicate glass of 32 μm thickness placed on top of the 1 mm borosilicate glass. Further, at wavelength $\lambda_{green}$=530 nm, the scanner captures a third interference image with a borosilicate glass of 1 mm thickness, and a fourth interference image with an additionally borosilicate glass of 32 μm thickness placed on top of the 1 mm borosilicate glass Still further, at wavelength $\lambda_{blue}$=450 nm, the scanner captures a fifth interference image with a borosilicate glass of 1 mm thickness, and a sixth interference image with an additionally borosilicate glass of 32 μm thickness placed on top of the 1 mm borosilicate glass. For each of the wavelengths $\lambda_{red}$, $\lambda_{green}$, and $\lambda_{blue}$ the exemplifying adding of the additional borosilicate glass of 32 μm thickness as described in the above example results in a respective phase shift. The phase shift is in general dependent on the wavelength, but borosilicate glass has a low dispersion (Abbe numbers around 65) with a refractive index $n_{borosilicate}$ of 1.5148 for red light ($\lambda_{red}$=640 nm with refractive index $n_{borosilicate}$ of 1.5196 for green light ($\lambda_{green}$=530 nm) and a refractive index $n_{borosilicate}$ of 1.5253 for blue light ($\lambda_{blue}$=450 nm). Therefore, the optical path difference (OPD) which is due to the adding of the 32 μm thick borosilicate, can be determined by multiplying the thickness $d_{borosilicate}$ of the additional glass with the difference $\Delta n$ of the refractive index $n_{borosilicate}$ of borosilicate glass (for the respective wavelength) and the refractive index $n_{air}$ of air: $OPD=\Delta n^* d_{borosilicate}$ ($n_{borosilicate}-n_{air}$)$^* d_{borosilicate}$. For red light $\lambda_{red}$=640 nm this yields an OPD of 16.47 μm, for green light $\lambda_{green}$=530 nm this yields an OPD of 16,641 m, and for blue light $\lambda_{blue}$=450 nm this yields an OPD of 16.81 μm.

Figure 4:
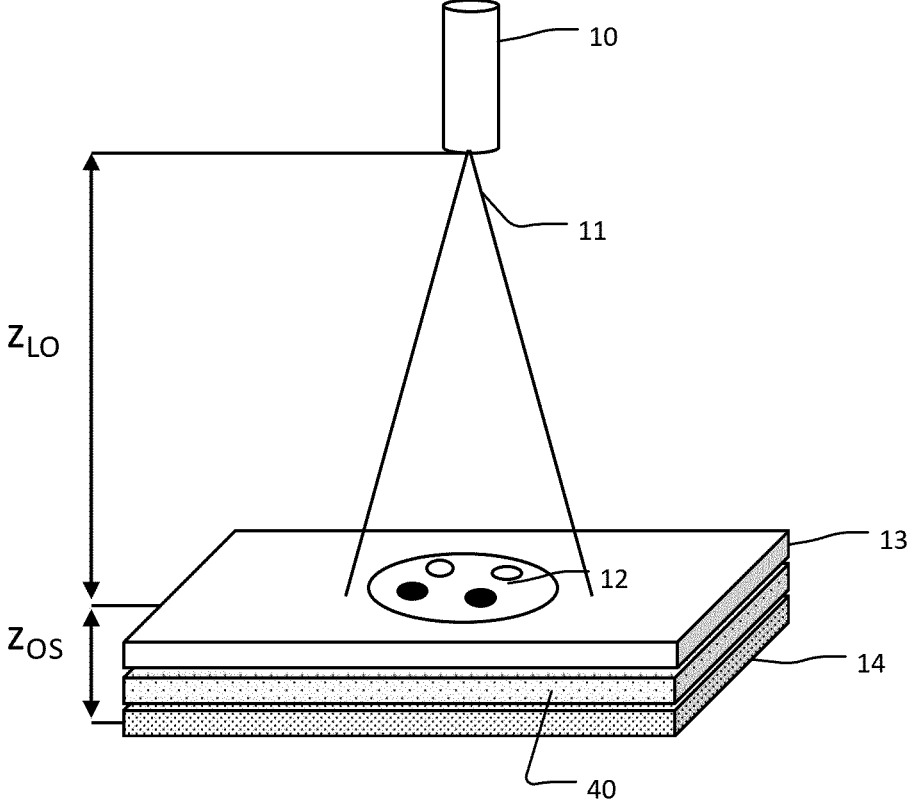
FIG. 4 shows a digital in-line holographic microscopy (DIHM) scanner with a switchable polarizer and a birefringent optical element to realize phase shift concept.

FIG. 4 shows a digital-in-line holographic microscopy (DIHM) scanner in which a phase-shift between, interference images is realized with a switchable polarizer and a birefringent optical element. Similar to the embodiment of FIGS. 1, 2 and 3, a in-line holography laser 10 sends out partially coherent time sequential illumination light beams 11 at predefined illumination light wavelengths. An object-plane 13 is located at a distance $z_{LO}$ from the in-line holography laser 10, wherein in the plane 12 an object, for example a tissue specimen, is placed. For each of the different predefined illumination light wavelengths, a monochrome image sensor 14, for example a CMOS or a CCD sensor, captures a respective interference pattern created by superposition of a wave front scattered (also called scattered wave) by the object 12 and an non-scattered wave front (also called reference wave). The monochrome image sensor 14 increases the contrast in the object 12. The monochrome image sensor 14 is placed at a distance $z_{OS}$ from the object-plane 13 in which the object 12 is located. In between the image sensor 14 and the object-plane 13 a birefringent optical element 40 with a polarizer is installed. A birefringent material is an anisotropic material which has the property that the refractive index depends on the polarization and propagation direction of light. That means, the incoming light beam 11 onto the birefringent optical element 40 is split into two orthogonally polarized components, namely the ordinary component and the extraordinary component, wherein each component is refracted, by the birefringent optical element 40 with a different refractive index. Therefore, the light that leaves the birefringent optical element 40 has a phase shift between the two orthogonally polarized components. The birefringent material can be a crystal, for example barium borate, calcite, quartz, ruby, etc. In order to realize a phase shift, the polarizer, which is part of the birefringent optical element 40, is switched between being permeable for either the ordinary component or the extraordinary component of the incoming light. In this setup a phase shift between at least two acquisitions of an interference patter of an object is obtained by changing the polarization, direction of the light (for example from p to s direction or from s to p) that is allowed to pass the polarization filter, that means switching the polarizer.

The DIHM scanner of FIG. 4 may for example be configured to establish a distance $z_{LO}$=5 cm between the laser and the object plane, and an object-to-sensor distance $z_{OS}$=1 mm, and may be configured to perform a partially coherent time-sequential illumination with three different wavelengths $\lambda_{red}$=640 nm, $\lambda_{green}$ 530 nm and $\lambda_{blue}$=450 nm and with two different phase shifts per wavelength. The DIHM scanner of FIG. 4 may for example be configured to use as a birefringent optical element calcite of 1 mm thickness. The first refractive index of calcite the ordinary refractive index $n_o$, varies between 1.9 and 1.5 in the wavelength span of 190 nm-1700 nm, while the second refractive index of calcite, the extraordinary refractive index $n_e$, varies between 1.6 and 1.4 in the wavelength span of 190 nm-1700 nm. For example, for $\lambda$=590 nm, calcite has ordinary and extraordinary refractive indices of $n_o$=1.658 and $n_e$1=1.486, respectively. For example, at wavelength $\lambda_{red}$=640 nm, the DIHM scanner captures a first interference image with the polarizer being permeable for the ordinary component, and a second interference image with the polarizer being permeable for the extraordinary component. Further, at wavelength green 530 nm, the scanner captures a third interference image with the polarizer being permeable for the ordinary component, and a fourth interference image with the polarizer being permeable for the extraordinary component. Still further, at wavelength $\lambda_{blue}$=450 nm, the scanner captures a fifth interference image with the polarizer being permeable for the ordinary component, and a sixth interference image with the polarizer being permeable for the extraordinary component. For each of the wavelengths $\lambda_{red}$, $\lambda_{green}$, and $\lambda_{blue}$ the exemplifying changing of the permeability of the polarizer of the above example results in a respective wavelength-dependent optical path difference OPD (and equivalently a phase shift) which is determined, as described in FIG. 3, by the two refractive indices $n_e$ and $n_o$ of calcite and the thickness of the calcite optical element $d_{calcite}$=1 mm.

In the embodiments of FIGS. 1 to 4 a monochrome image sensor is used to generate the inference images. This allows for a high image resolution. However, according to other embodiments, the image sensor may also be a non-monochrome sensor with a colour filter array for arranging RGB colour filters on a square grid of photosensors, e.g. a Bayer filter. A Bayer filter has a mosaic structure, where colour filters, for example red, green and blue, are arranged above a square grid of pixels of an image sensor. For example, the filter pattern is 50% green, 25% red and 25% blue. The laser emits illumination light comprising different wavelengths (for example red, green blue). The sensor with the colour filter is thus able to concurrently capture interference images (holograms) for each of the three different illumination light wavelengths, red, green and, blue.

Figure 5:
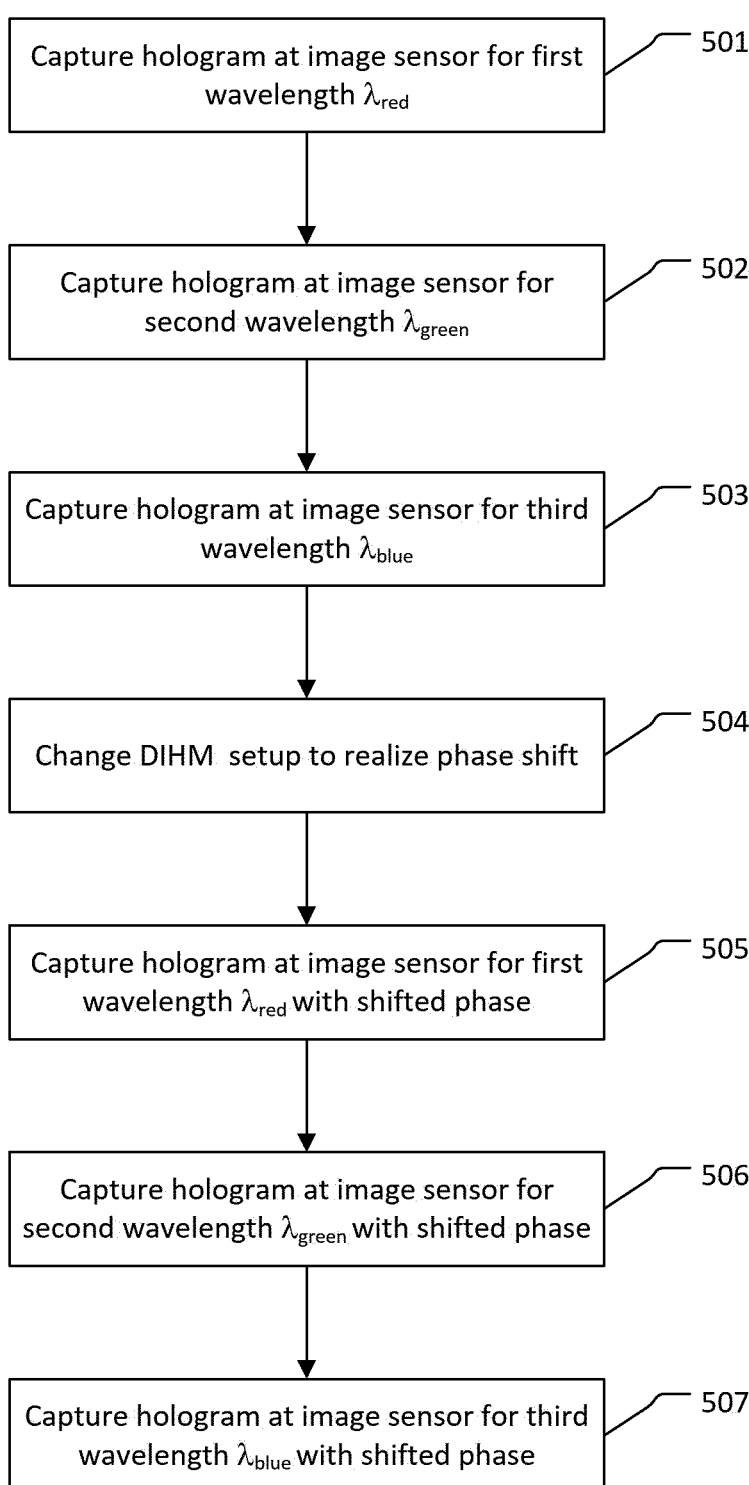
FIG. 5 shows a flow chart of the process of capturing different holograms.

FIG. 5 shows a flow chart of the process of capturing different interference images (holograms). In step 501, a hologram is capture at the image sensor 14 for a first wavelength $\lambda_{red}$. In step 502, a hologram is capture at the image sensor 14 for a second wavelength $\lambda_{green}$. In step 503, a hologram is capture at the image sensor 14 for a third wavelength $\lambda_{blue}$. In step 504, the DIHM scanner setup is changed to realize a phase shift. This can be achieved as described in any of the embodiments of FIG. 1-FIG. 4 or by any combination thereof. In step 505, a hologram is captured at the image sensor 14 for a first wavelength $\lambda_{red}$ and with a shifted phase. In step 506, a hologram is capture at the image sensor 14 for a second wavelength $\lambda_{green}$ and with a shifted phase. In step 507 a hologram is capture at the image sensor 14 for a third wavelength λblue and with a shifted phase.

According to this embodiment, six different interference images (holograms) are obtained. This number of images captured is, however, only for illustrative purposes. More than two interference images can be captured per wavelength (colour) and less or more colours might be used.

Also, in another embodiment, a first hologram may be captured for the first wavelength, then the DIHM scanner setup may be changed to realize a phase shift and a second hologram for the first wavelength may be captured, and then the same may be repeated for the second and the third wavelength.

Digital Processing of Captured Holograms

Each specimen introduces a delay in the light path when light propagates through it. This amount of delay is also called "phase shift" or "Optical Path Difference". The DIHM scanners and their operation as described in FIGS. 1 to 5 above allow to control/introduce extra phase shift when capturing interference images. In particular, as described with regard to FIGS. 1 to 5 above, for each of as set of predefined wavelengths, multiple interference images (holograms) are captured at different phases. In other words, for each wavelength, multiple interference images (holograms) are captured with predefined phase shifts.

Figure 6:
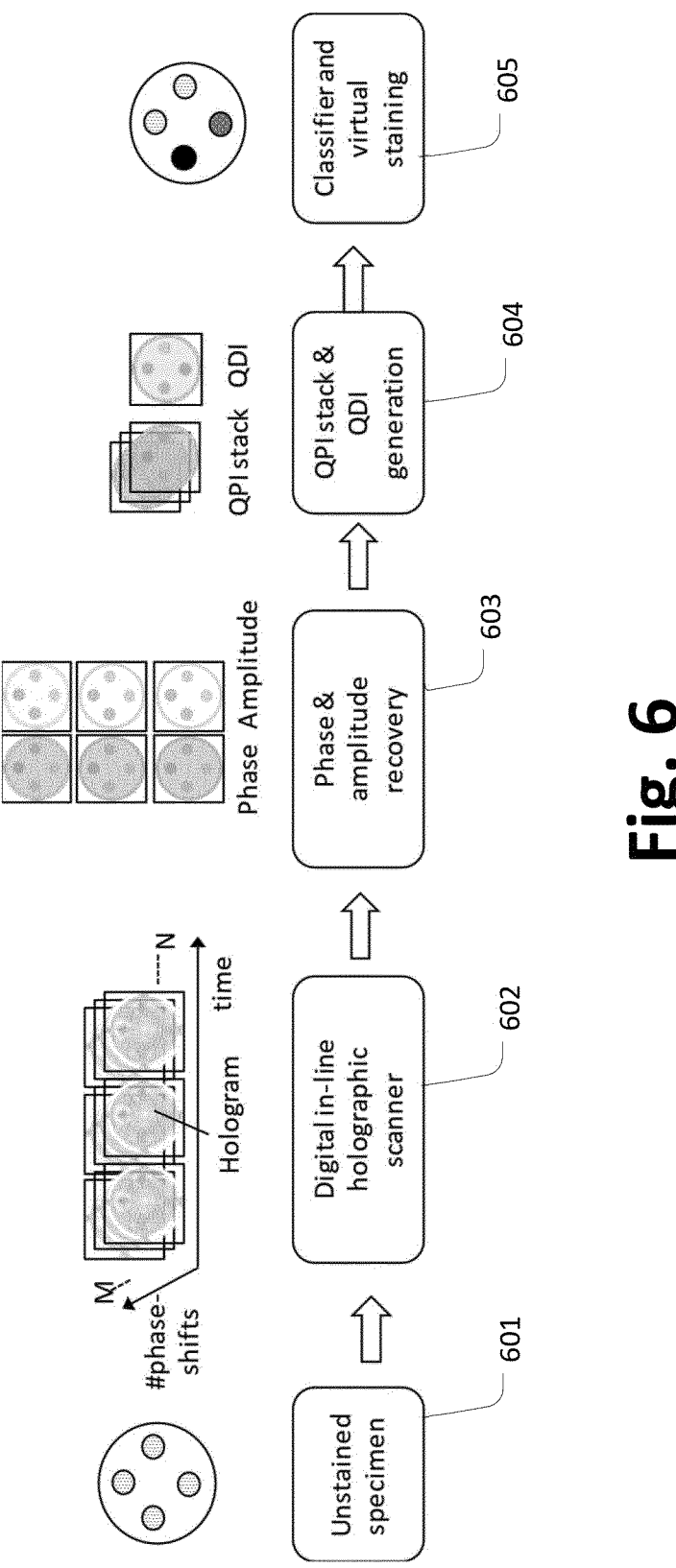
FIG. 6 shows process steps for a virtual staining process operated on an unstained input object (tissue specimen)

FIG. 6 shows process steps for a virtual staining process operated on an unstained input object (tissue specimen). In process step 601, an unstained specimen is input into a DIHM scanner. In process step 602, a number of M phase-shifted holograms (here for example M=3) of the specimen are taken per N different illumination wavelengths (here for example N=3), wherein the N different illumination wavelengths are applied time-sequentially (see also FIGS. 1-5). This results in a total number of M×N holograms. In process step 603, for, each different illumination wavelength a quantitative phase image (QPI) and an amplitude of the specimen is reconstructed (see also FIG. 7 below and corresponding description for details). In process step 604, the resulting quantitative phase images (QPIs) for each wavelength are collected in a QPI stack, the intensity images are collected in a colour image and a QDI of the specimen is constructed (see FIG. 8 below for details). In process step 605, a classifier is operated on the QDI. This classifier allows for a "virtual staining" (see FIGS. 9-12) of the specimen.

Decoding of Quantitative Phase Images and Amplitude Image from Interference Images (Holograms)

The different phase-shifted holograms captured by a DIHM scanner per wavelength contain amplitude and phase information related to the scanned object 12 which is encoded into the interference patterns (holograms). For each illumination light wavelength, amplitude and phase information of the scanned object 12 can be decoded by means of an algorithm such as for example the so called Gerchberg-Saxton algorithm, which is for example explained in "A Practical Algorithm for the Determination of Phase from Image and Diffraction Plane Pictures" by W. Gerchberg and W. O. Saxton from 29 Nov. 1971, or in the book "Handbook of Optical Systems: Volume 5: Metrology of Optical Components and Systems, Volume 5" by Herbert Gross Bernd Dörband Henriette Müller.

Figure 7:
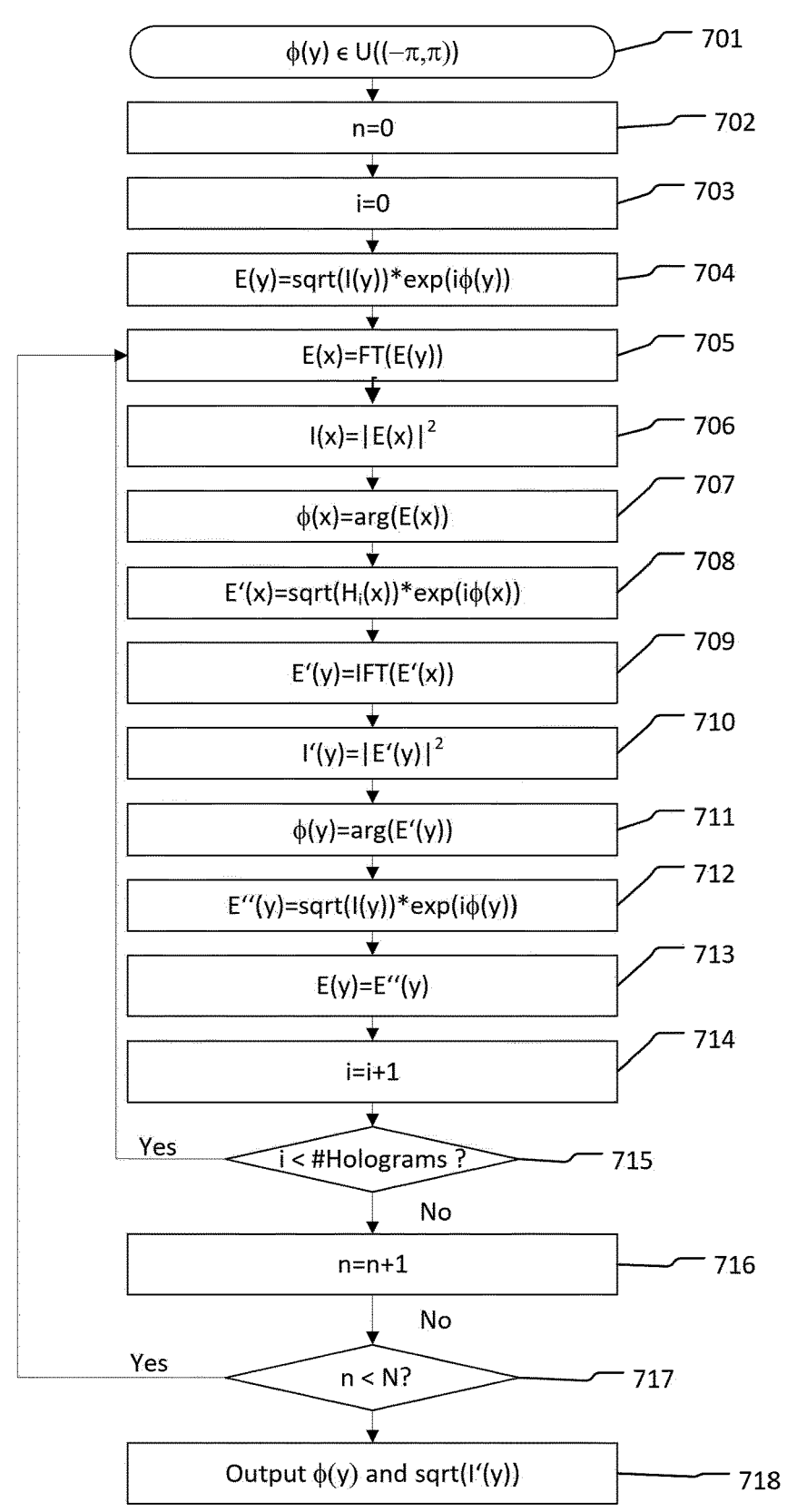
FIG. 7 shows a flow chart of the Gerchberg-Saxton algorithm.

In general, the Gerchberg—Saxton algorithm is an iterative algorithm which allows to retrieve the phase of a pair of light distributions/planes which stem from two operation modes—imaging and diffraction. The light distribution in the image plane (also called image plane wave) and the light distribution in the diffraction plane (also called diffraction plane wave) are related via a propagating function, such as the Fourier transform. The amplitude of the light distribution in the diffraction plane is given by the recorded hologram as described above. The two or more phase-shifted holograms (M holograms in FIG. 6) can be used in the algorithm to speed-up convergence. The amplitude of the image plane wave can be obtained by a Fourier transform of the diffraction plane wave. The image plane wave E(y) and the diffraction plane wave E(x) are complex valued functions, that is they comprise a complex value for each pixel. They can be represented in the Euler representation of a complex number, with phase angle φ and amplitude sqrt(I), which is the square root (sqrt) of the intensity I. This yields for the image plane wave $E(y)=sqrt(I(y))exp(i\phi(y))$ and for the diffraction plane wave $E(x)=sqrt(I(x))exp(i\phi(x))$. The diffraction plane wave intensity I(x) is given by the recorded holograms as described above. The image plane wave intensity I(y) (also called input image plane wave intensity) can be obtained by a Fourier transform of the diffraction plane wave intensity, FIG. 7 shows a flow chart of the Gerchberg-Saxton algorithm. In step 701, the phase φ(y) of an image plane wave E(y) is randomly chosen from a uniform distribution $U((-\pi,\pi))$. In step 702, the iteration counter n for the outer iteration is set n=0. In step 703, the iteration counter i for the inner iteration is set to i=0. In step 704, the image plane wave $E(y)=sqrt(I(y))*exp(i\phi(y))$ is determined based on intensity I(y) of the input image plane wave and the randomly chosen phase (y) of the image plane wave. In step 705, a diffraction plane wave E(x)=FT(E(y)) is determined by applying the Fourier transform FT to the image plane wave E(y). In step 706, the intensity $I(x)=|E(x)|^2$ of the diffraction plane wave E(x) is determined. In step 707, the phase φ(x)=arg(E(x)) of the diffraction plane wave E(x) is determined, by applying the argument function arg to the diffraction plane wave E(x). In step 708, a modified diffraction plane wave $E'(x) sqrt(H_i(x))*exp(i\phi(x))$ is determined based on the intensity value of the i-th recorded hologram $H_i(x)$) and the phase φ(x) of the diffraction plane wave. In step 709, an improved image plane wave E'(y)=IFT (E'(x)) is determined by applying the Inverse Fourier transform IFT to the modified diffraction plane wave E'(x). In step 710, the intensity $I'(y)=|E'(y)|^2$ of the improved image plane wave E'(y) is determined. In step 711, the phase φ(y)=arg(E'(y)) of the improved image plane wave E'(y) is determined, by applying the argument function arg to the improved image plane wave E"(y). In step 712, a modified image plane E"(y)=sqrt(I(y))*exp(iφ(y)) is determined based on the phase φ(y) of the improved image plane wave E'(y) and the input image plane wave intensity I(y). In step 713, the image plane wave E(y)=E"(y) is set equal to the modified image plane wave E"(y). In step 714 the inner iteration counter i is set to i+1. In step 715, it is asked if the inner iteration counter i is smaller than the number of recorded holograms (this is the value M in FIG. 6 and FIG. 13). If the answer in step 715 is yes, then it is proceeded with step 705. If the answer in step 715 is $n_o$, then it is proceeded with step 716. In step 716 the outer iteration counter n is set to n+1. In step 717, it is asked if the outer iteration counter n is smaller than the number of maximal iterations N. The number of maximal iterations N is a predetermined natural number, for example 50. If the answer in step 717 is yes, then it is proceeded with step 705. In another embodiment, instead or additional to the N-iteration stopping criterion a convergence criterion may be used to terminate the algorithm, for example a convergence criterion to terminate the algorithm may be a squared error between estimated magnitudes and known magnitudes being smaller than a predetermined value. If the answer in step 717 is $n_o$, then the algorithm ends by outputting the phase $\phi(y)$ of the improved image plane wave E'(y) and the amplitude sqrt(I'(y)) of the improved image plane wave E'(y).

The number of recorded holograms M per wavelength is greater or equal than 1.

The Gerchberg-Saxton algorithm of FIG. 7 as described above is applied to each of the three wavelengths $\lambda_{red}$, $\lambda_{green}$, $\lambda_{blue}$. The phase $\phi(y)$ of the improved image plane wave for each of the wavelengths $\lambda_{red}$, $\lambda_{green}$, $\lambda_{blue}$ is called quantitative phase image (QPI). From the amplitude sqrt(I'(y)) of the improved image plane wave for each of the wavelengths $\lambda_{red}$, $\lambda_{green}$, $\lambda_{blue}$ a RGB colour image of the object 12 can be reconstructed. This can for example be done by defining the intensity of each pixel of the colour image by the combined intensity of each component, i.e. per pixel colour image intensity=($\frac{1}{3}$ intensity red, $\frac{1}{3}$ intensity green, $\frac{1}{3}$ intensity blue).

If holograms for more than three wavelengths or wavelength other than red, green and blue, are captured, the process described above in FIG. 7 is applied to these holograms as well.

Each quantitative phase image (QPI) contains the absolute phase shift, i.e. the optical path delay (PD) through the object per pixel and wavelengths. This optical phase shift, or phase delay (PD), which is given for example in radian, can easily be transferred into the optical path difference (OPD) that is caused by each, pixel for each wavelength by:

$$OPD_i[\text{nm}] = PD/(2\pi * \lambda_i[\text{nm}])$$

wherein the index i is element of the set {red, green, blue}.

In case that the object is a tissue specimen, the colour image as well as the different QPIs can then be used for virtual staining and classification of each pixel of the tissue specimen, which is described in more detail below.

Construction of Quantitative Dispersion Image (QDI)

In the following an exemplifying process of determining a quantitative dispersion image QDI from a set of quantitative phase images QPI is described. Dispersion in optics describes the phenomenon that the refractive index of a material differs for different wavelength. Constructing a quantitative dispersion image of an object allows to quantize the dispersion of each image pixel.

Therefore, first a refractive index for each pixel and each wavelength of the scanned object 12 is calculated.

Each pixel of a quantitative phase image $QPI_i$ as obtained by the process described in FIG. 7 above describes a phase delay value $PD_i$, which is typically given in the quantity radian ("rad") which is a standard unit for measuring angles. The index i represents the illumination wavelength (e.g. i ∈ {red, green, blue}) at which quantitative phase image $QPI_i$ was captured.

The optical path difference $OPD_i$ is directly related to the phase delay value $PD_i$ as follows, and may for example be expressed in nanometer, nm:

$$OPD_i[\text{nm}] = PD_i[\text{rad}]/2\pi * \lambda_i[\text{nm}]$$

The optical path difference $OPD_i[\mu\text{m}]$ is the difference between the optical path length $OPL_{i,object}$ through the object (tissue specimen) and the optical path length $OPL_{i,reference}$ through the reference medium (air):

$$OPD_i[\mu\text{m}] = OPL_{i,object}[\mu\text{m}]OPL_{i,object}[\mu\text{m}].$$

The optical path length $OPL_{i,object}$ through the object (the tissue specimen, 12 in FIGS. 1 to 4) with thickness d and refractive index $n_{i,object}$ at wavelength i is defined as:

$$OPL_{i,object}[\mu\text{m}] = n_{i,object} * d[\mu\text{m}]$$

Accordingly, the optical path length $OPL_{i,reference}$ through a reference medium with thickness d corresponding to the thickness d of the object (tissue specimen) scanned by the DHIM scanner, and with refractive index $n_{i,reference}$ at wavelength i is defined as:

$$OPL_{i,reference}[\mu\text{m}] = n_{i,reference} * d[\mu\text{m}]$$

Therefore, the refractive index $n_{i,object}$ of the object at wavelength i can be obtained as:

$$n_{i,object} = n_{i,reference} - \frac{OPD_i[\mu m]}{d[\mu m]}$$

The optical path difference $OPD_i$ ca be normalized regarding the thickness d of the object (tissue specimen) scanned by the DHIM scanner (expressed e.g. in micrometer, $\mu$m), which yields the normalized optical path difference $NOPD_i$:

$$NOPD_i[\text{mm}/\mu\text{m}] = OPD_i[\text{mm}]/d[\mu\text{m}]$$

Using this normalized optical path difference $NOPD_i$, the refractive index $n_{i,object}$ of the object at wavelength i can be expressed as:

$$n_{i,object} = n_{i,reference} - \frac{NOPD_i\left[\frac{mm}{\mu m}\right]}{1000}$$

After acquisition of the refractive index $n_{i,object}$ per illumination wavelength i (here for example i ∈ {red, green, blue}) a quantitative dispersion value $QDV_{object}$ of the object at a respective pixel of the image can be calculated as:

$$QDV_{object} = \frac{n_{green,object} - 1}{n_{blue,object} - n_{red,object}}$$

By calculating this quantitative dispersion value $QDV_{object}$ for each pixel, the quantitative dispersion image QDI is obtained.

The above described determination of the QDI can be done with any wavelengths that the DIHM scanner operates with. The determination may for example be done for three illumination wavelengths. If, for example, three different wavelengths are applied, these three wavelengths may be ordered as: $\lambda_{long} > \lambda_{middle} > \lambda_{short}$, and with the corresponding refractive indices $n_{short}$, $n_{middle}$, $n_{long}$, the quantitative dispersion value $QDV_{object}$ for each pixel can be calculated by:

$$QDV_{object} = \frac{n_{middle,object} - 1}{n_{short,object} - n_{long,object}}$$

The same principles apply if less than three or more than three different wavelengths are applied. FIG. 8 shows a flow chart of the above process of calculating a quantitative dispersion image QDI from a set of quantitative phase images $QPI_i$. In step 801, for each wavelength i and for each pixel of the quantitative phase image $QPI_i$, an optical path difference $OPD_i$ is calculated based on a respective phase delay value $PD_i$ of the quantitative phase image $QPI_i$. In step 802, for each pixel and for each, of the wavelengths i, a normalized optical path difference $NOPD_i$ is calculated based on the respective optical path difference $PD_i$ and the thickness d of the object (tissue specimen) scanned by the DHIM scanner. In step 803, for each pixel and for each of the wavelengths i, a refractive index $n_{i,object}$ is calculated based on a predetermined refractive index $n_{i,reference}$ of a reference medium and on the respective normalized optical path difference $NOPD_i$. In step 805, a quantitative dispersion image QDI is determined by calculating, for each pixel, a quantitative dispersion value $QDV_{object}$ based on the respective refractive indices $n_{i,object}$ of the wavelengths i.

Classifier and Virtual Staining

Virtual staining of an object, for example a tissue specimen, means virtually simulating how an object would look like if it was stained with a respective histochemical dye. In virtual staining of a tissue specimen, a digital representation that is equivalent to a chemically stained (labeled) version of the tissue specimen is created. A classification algorithm (classifier) is trained, which yields a trained classifier (see FIG. 9 for more details). The trained classifier receives as an input for each, pixel, either the QDI value and/or the QPI value (for each colour) and/or the colour image value, or all or a combination of these three, and outputs for each pixel a probability value that the pixel is stained with a certain staining chemical and thereby a virtually stained colour image is received (see FIG. 10a for more details). For example, if the trained classifier was trained with the histochemical dye Hematoxylin and Eosin, the trained classifier is able to output a probability for each pixel that it is stained by Hematoxylin, a probability for each pixel that it is stained by Hematoxylin and a probability for each pixel that it is stained by neither of the two, wherein this classification is based on (that is the input for the classifier) the QDI value and/or on the QPI value (for each colour) and/or on the colour image value.

As stated above, the quantitative dispersion image QDI is a fast and compact way to condense a "phase characteristic" of the scanned object (12 in FIGS. 1 to 4) into one image. This is especially useful if a classification and visualisation is done via a classification learning algorithm, as described below.

A classification and learning algorithm can operate with the quantitative dispersion image QDI as such, or on a combination of the quantitative dispersion image QDI with QPI data and colour image data.

Classification algorithms are known to the skilled, person. For example there exist classification algorithms that, are based on supervised learning to obtain a trained classifier.

For example, linear regression, linear classifiers (Naïve Bayes, perceptron, logistic regression), quadratic classifiers, support vector machines (SVM), kernel density estimators, k-nearest neighbor, artificial neural networks (ANN) or more.

Figure 9:
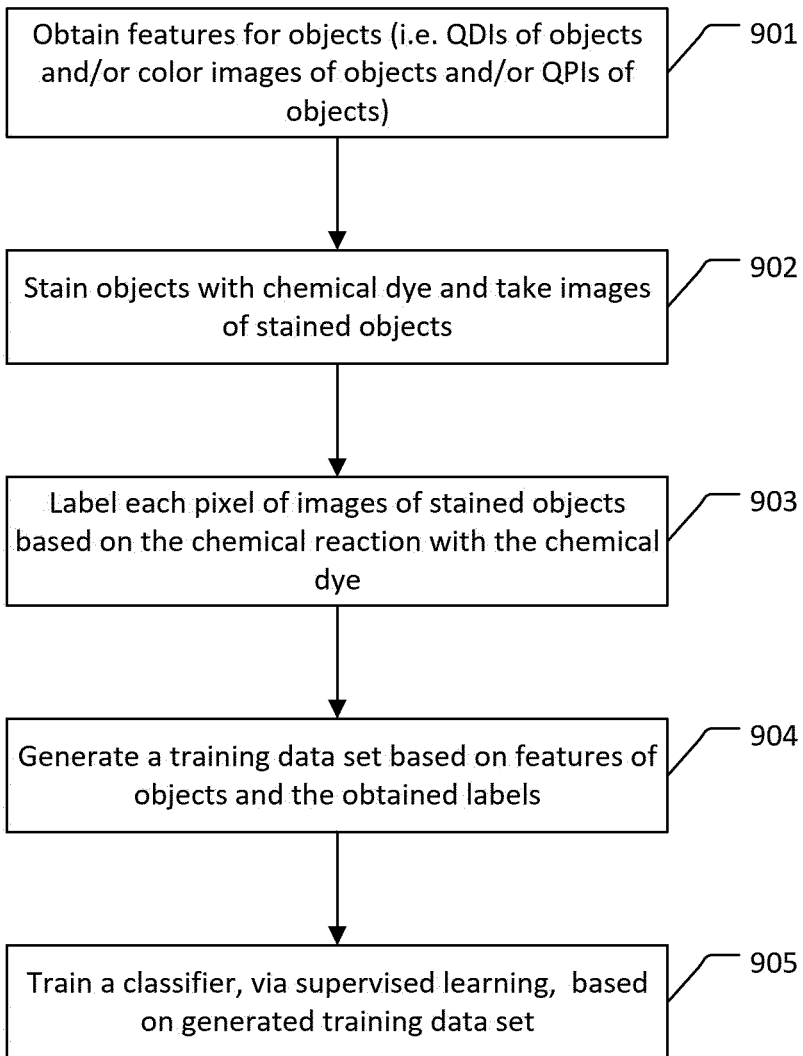
FIG. 9 shows a flow chart of generating a trained classifier for virtual staining.

FIG. 9 shows a flow chart of generating a trained classifier for virtual staining. In step 901 the features (or feature vector) for the plurality of different objects are obtained, which are for example the QDIs of the objects and/or the colour images of the objects and/or the QPIs of objects. In step 902, the objects, are stained with a chemical dye (for example with Hematoxylin and Eosin) and (colour) images of the of the stained objects are taken. In step 903, each pixel of the images of stained objects are labelled based on the chemical reaction with the chemical dye. For example, the pixels that reacted with Hematoxylin are labeled with "H", the pixels that reacted with Eosin are labeled with "E" and the pixels that did not react with any chemical are labeled with "None". In step 904, a data set is generated based on features of objects and the obtained labels. For, example, the data set may comprise a pair for each object, comprising the features and the label, is generated. In step 905, a classifier is trained, via supervised learning, based on generated training data set.

For example if an ANN is used as classifier, the training step 905 can be done by the skilled person by using any known techniques, such as the original training mechanism for the Long-Short-Term-Memory (LSTM) as described by Gers et al., 2002 in "Learning Precise Timing with LSTM Recurrent Networks" in the Journal of Machine Learning Research 3 (2002), 115-143, which is based on a gradient method to adjust the weights of the LSTM units. During this training process the neural network is preferably presented with, a large number of examples (training data). The output layer may realized as a Softmax layer that, assigns normalized decimal probabilities to each class in a multi-class problem.

Figure 10A:
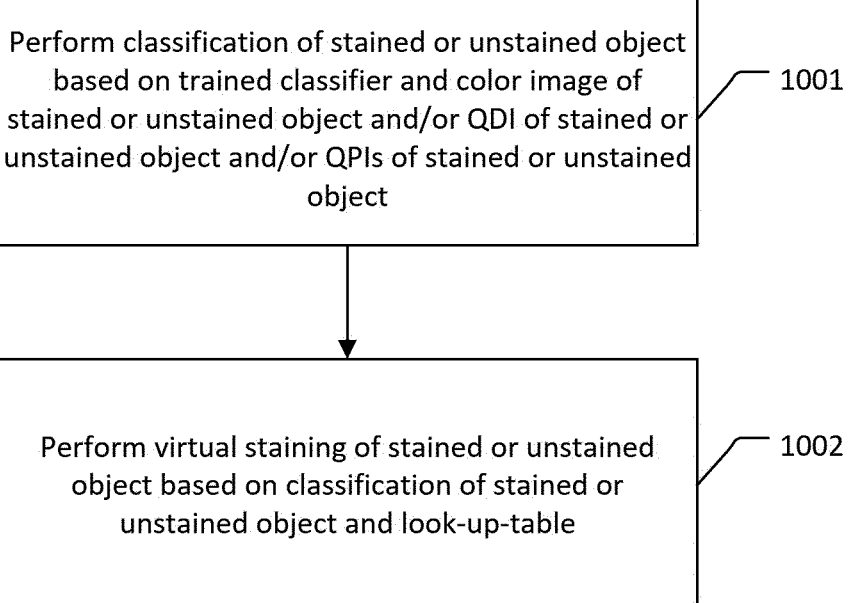
FIG. 10a shows a flow chart of a process of virtual staining of an object.

FIG. 10a shows a flow chart of a process of virtual staining of an object. In step 1001, classification of a stained or unstained object based on the trained classifier and the colour image of the stained or unstained object and/or the QDI of the stained or unstained object and/or the QPIs of the stained or unstained object is performed. In step 1002, virtual staining of the stained or unstained object based on the classification of stained or unstained object and a loop-up-table is performed.

When the trained classifier receives as an input the QDI, the QPIs or the colour image (or all or a combination thereof) of the object it outputs a probability distribution over the different base classes of the histochemical dyes it was trained with, that is a probabilistic value (between [0, . . . ,1]) of the different base classes for all histochemical dyes that it was trained for. For example, in case the classifier was trained with Hematoxylin and Eosin the base classes are: probability_H=probability that pixel should be virtually stained with Hematoxylin, probability_E=probability that pixel should be virtually stained with Eosin and probability_N=probability that none of the two above. Then a lookup table (LUT) can be applied to realize the virtual staining for example for Hematoxylin and Eosin (HE): Virtual_stained_HE_image(R,G,B)=LUT(probability_H, probability_E, probability_N). For example, the lookup table LUT can determine for a specific pixel that, if the probability_H is the highest value among all base classes, the pixel is coloured blue, if the probability_E is the highest value among all base classes, the pixel is coloured red, and if the probability_N is the highest value among all base classes, the pixel is coloured white. Thereby, a virtually stained colour image of the object, for example, a tissue specimen, is obtained.

The trained classifier can receive a labelled (that is chemically stained) or unlabeled (that is chemically unstained) image of an object as input, wherein if the object (for example a tissue specimen) is labelled the colour image reconstruction provides additional contrast information to the classification. Depending on this, there are different virtual staining operations that are available, for example a virtual staining can be added, or a chemical staining can be virtually removed, or a virtual staining can be transferred, or a chemical staining ca be virtually improved (see FIG. 11 and FIG. 12 for more details). The term virtual staining of an object also implies the above and below mentioned virtual staining operations of the object.

FIG. 10b shows an exemplifying mapping of QDI pixel, values to their corresponding classification. Here, a classifier that was trained with QDIs of different objects that were stained Hematoxylin and Eosin and therefore, a direct classification between a pixel value of a QDI and a class, that is Hematoxylin, Eosin or none is possible. In table 1003, for pixel values of the QDI between 0.1 and 0.2 the pixel is classified as being stained with Hematoxylin. In table 1003, for pixel values of the QDI between 0.5 and 0.8 the pixel is classified as being stained with Eosin. In table 1003, for pixel values of the QDI other than the above the pixel is classified as not being stained with either Hematoxylin or Eosin, i.e. none.

Exemplifying Virtual Staining Operations

Figure 11:
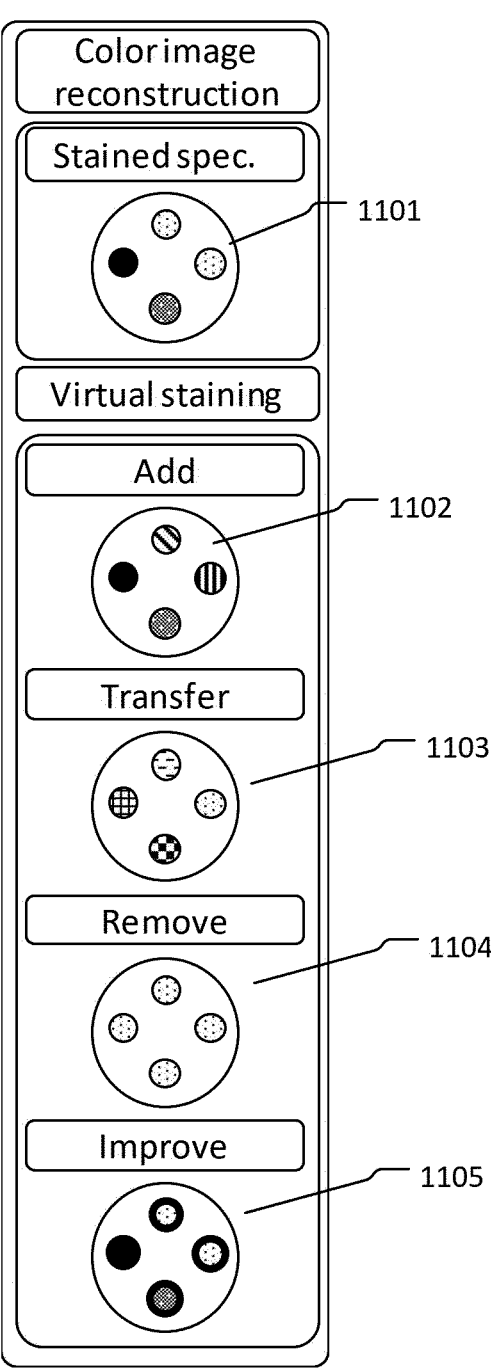
FIG. 11 shows different virtual staining operations that can be applied to a stained tissue specimen, input to the DIHM scanner.

FIG. 11 shows different virtual staining operations that can be applied to a stained tissue specimen, input to the DIHM scanner. First a digital colour reconstruction of the scanned chemically stained (i.e. labeled) tissue specimen 1101 is reconstructed. In an ADD operation 1102, a digital representation of the scanned chemically stained tissue specimen is created, which is equivalent to a brightfield representation of any additional chemical staining applied to the same scanned stained tissue specimen. In a REMOVE operation 1103, a digital representation of the scanned chemically stained tissue specimen is created, which is equivalent to a brightfield representation of a chemically non-stained tissue specimen with increased imaging, contrast. In a TRANSFER, operation 1104, a digital representation of the scanned chemically stained tissue specimen is created, which is equivalent to a brightfield representation of any additional chemical staining applied to the same scanned chemically non-stained tissue specimen (that is TRANSFER=REMOVE & ADD). In an IMPROVE operation 1105, a digital representation of the scanned chemically stained tissue specimen is created, which is a highly accurate reproduction of the original scanned chemically stained tissue specimen, which is improved in terms of colour range and resolution.

Figure 12:
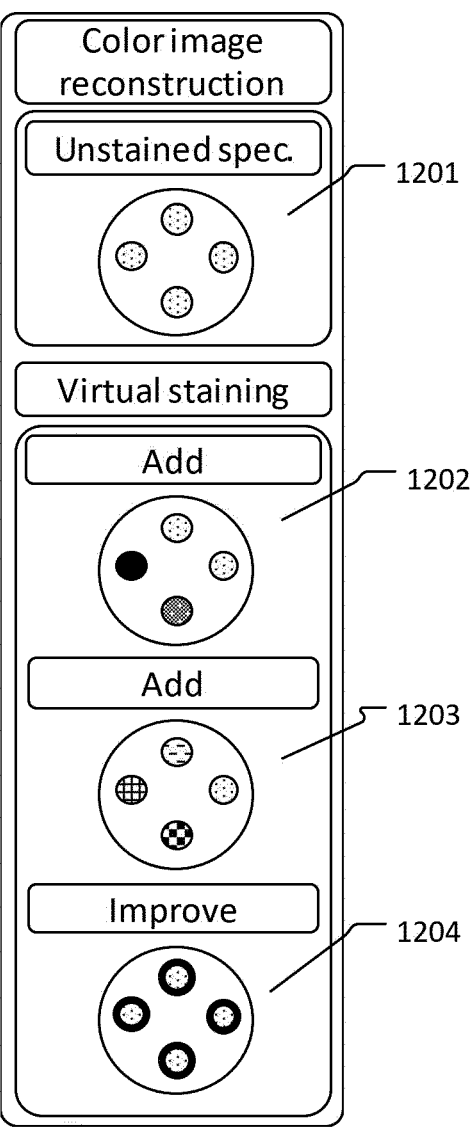
FIG. 12 shows different virtual staining operations that can be applied to an unstained tissue specimen, input to the DIHM scanner.

FIG. 12 shows different virtual staining operations that can be applied to an unstained tissue specimen, input to the DIHM scanner. First a digital colour reconstruction of the scanned chemically non-stained (i.e. unlabeled) tissue specimen 1201 is reconstructed. In a first ADD operation 1202, a digital representation of the scanned chemically non-stained tissue specimen is created, which is equivalent to a brightfield representation of any chemical staining applied to the scanned chemically non-stained tissue specimen. In a second ADD operation 1203, a digital representation of the scanned chemically non-stained tissue specimen is created, which is equivalent to a brightfield representation of any additional chemical staining, other than the first ADD operation, applied to the scanned chemically non-stained tissue specimen. In an IMPROVE operation 1204, a digital representation of the scanned chemically non-stained tissue specimen is created, which is a highly accurate reproduction of the original scanned chemically-non-stained tissue specimen, which is improved in terms of colour range and resolution.

To overcome possible resentments and accelerate market introduction of the proposed system one potential embodiment of our proposed system comprises a compatibility mode (IMPROVE), outputting the color image of a specimen as a highly accurate reproduction of the original specimen e.g. in terms of color range and resolution Virtual Staining of a Chemically Stained Input Object (Tissue Specimen)

Figure 13:
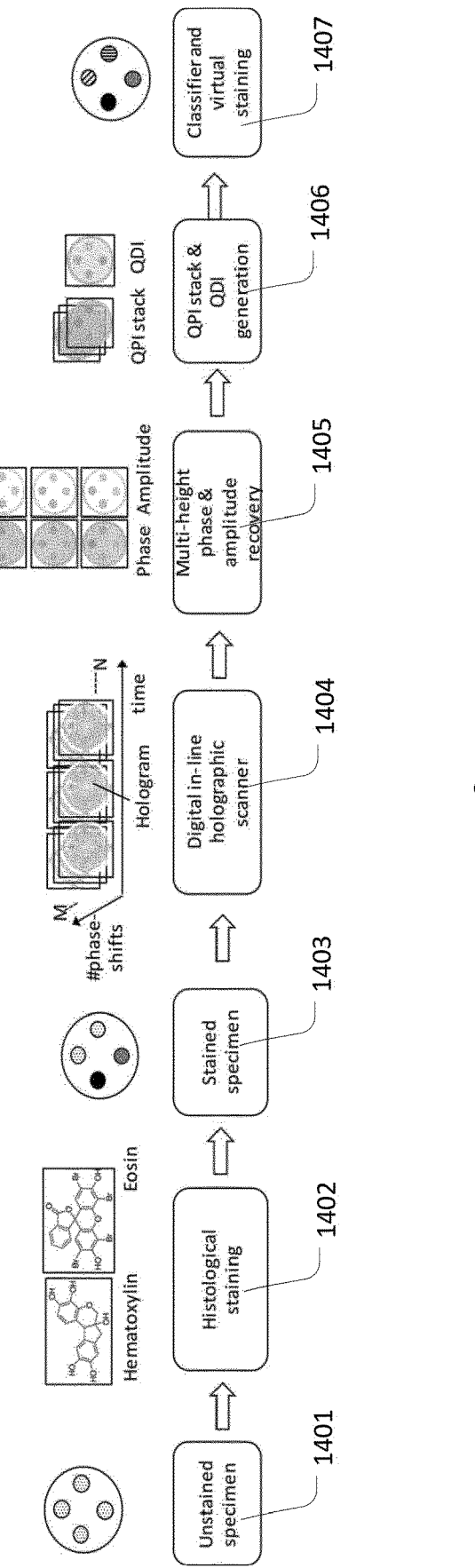
FIG. 13 shows the process steps for a chemically stained input object (tissue specimen) to be virtually stained.

FIG. 13 shows exemplifying process steps for a chemically stained input object (tissue specimen) to be virtually stained. In process steps 1401 and 1402 an unstained specimen is chemically stained, for example with Hematoxylin and Eosin. In process step 1403, the stained specimen is input into the DIHM scanner. In process step 1404, respective M phase-shifted holograms (for example M=3) of the specimen are taken for N different illumination wavelengths (for example N=3), wherein the N different illumination wavelength are applied time-sequentially (see also FIGS. 1-5). In process step 1405, for each different illumination wavelength an amplitude and a phase image of the specimen is reconstructed with the modified Gerchberg-Saxton algorithm (see also FIG. 7). In process step 1406, QPIs for each wavelength, a colour image and a QDI of the specimen are constructed (see FIG. 8). In process step 1407, a classifier is trained, and virtual staining is performed (see FIGS. 9-12).

Computer-Implementation of the Processes

Figure 14:
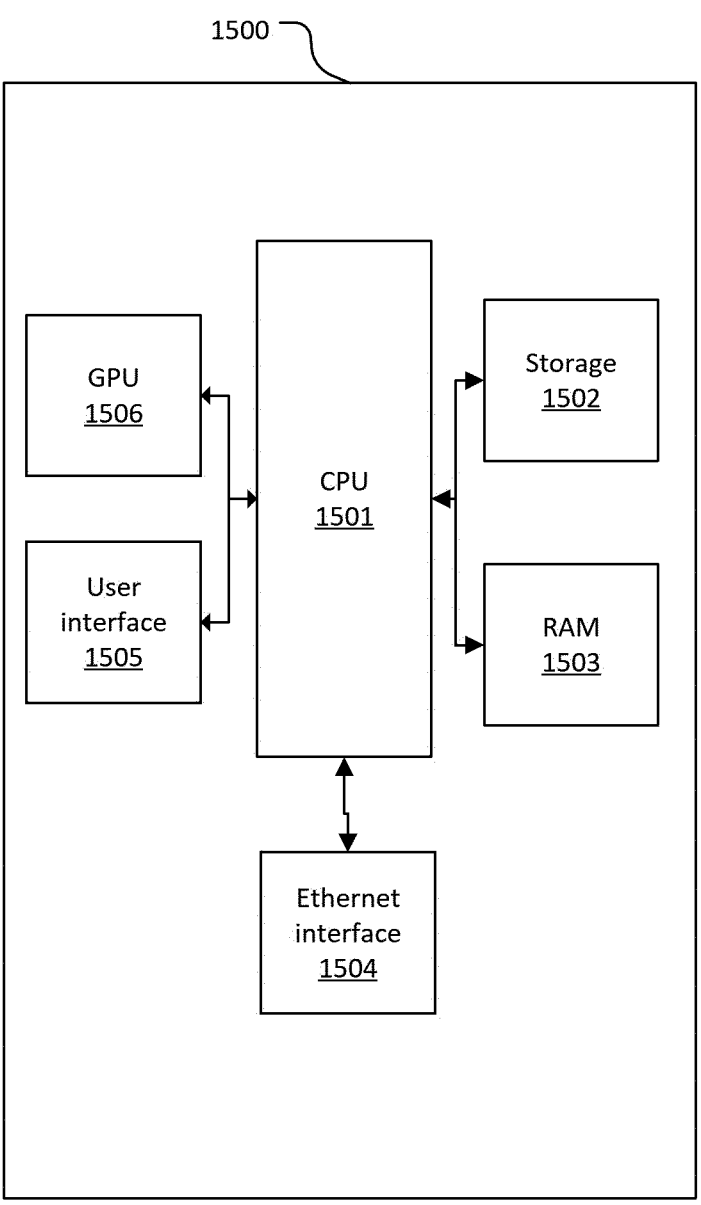
FIG. 14 schematically describes an embodiment of an electronic device which may implement the functionality of the process steps described above.

FIG. 14 schematically describes an embodiment of an electronic device which may implement the functionality of the process steps described above.

The electronic device 1500 comprises a CPU 1501 as processor. The electronic device 1500 further comprises a GPU 1506 that is connected to the processor 1501. The electronic system 1500 further comprises an Ethernet interface 1504 which acts as interface for data communication with external devices, as for example a DIHM scanner. The DHIM scanner can also be connected to the electronic device with other standard connection buses, like USB. The electronic device 1500 further comprises a data storage 1502 and a data memory 1503 (here a RAM). The data memory 1503 is arranged to temporarily store or cache data or computer instructions for processing by the processor 1501. The data storage 1502 is arranged as a long-term storage, e.g., for recording a scanned hologram or the labelled (in the sense of labelled for supervised learning) data which is necessary the supervised learning of the classification algorithm. The data storage 1502 and the data memory 1503 may comprise computing instructions that implement the processes described above, e.g. a process of recording and storing a scanned hologram of an object. The computing instructions may further implement a process of decoding the hologram of the object to obtain phase and amplitude information of the object. The computing instructions may further implement the functionality of calculating a colour image, QPIs and a QDI of the object. The computing instructions may further implement the process of training a classification algorithm and the performing virtual staining operations as described above.

It should be recognized that the embodiments describe methods with an exemplary ordering of method steps. The specific ordering of method steps is, however, given for illustrative purposes only and should not be construed as binding. For example, steps 501, 502, 503, or steps 504, 506, 507 in FIG. 5, or the steps in FIG. 7 or the other figures could be exchanged.

In so far, as the embodiments of the disclosure described above are implemented, at least in part, using software-controlled data processing apparatus, it will be appreciated that, a computer program providing such software control and a transmission, storage or other medium by which such a computer program is provided are envisaged as aspects of the present disclosure.

Note, that the present technology can also be configured as described below:

(1) A method comprising determining a quantitative dispersion image (QDI) of an object (12) based on a set of quantitative phase images (QPI), each quantitative phase image of the set of quantitative phase images having been obtained with a respective different illumination light wavelength.

(2) The method of (1) further comprising, calculating, for each different illumination light wavelength, the respective phase image based on respective one or more phase-shifted holograms of the object (12).

(3) The method of (1) or (2) further comprising, acquiring, for each different illumination light wavelength, respectively one or more phase-shifted holograms of the object (12) at an image sensor (14).

(4) The method of anyone of (1) to (3), wherein the determining a quantitative dispersion image (QDI) of the object comprises calculating, for each of different illumination light wavelengths and for each pixel of the quantitative dispersion image (QDI), an optical path difference (OPD) based on a phase delay value (PD) of a respective pixel of the respective quantitative phase image (QPI).

(5) The method of (4), wherein the determining a quantitative dispersion image (QDI) of the object (12) comprises calculating, for each of different illumination light wavelengths and for each pixel of the quantitative dispersion image (QDI), a refractive index ($n_i$)based on a predetermined refractive index ($n_{reference}$) of a reference medium and the optical path difference (OPD) of a respective pixel of the respective quantitative phase image (QPI).

(6) The method of (5), wherein the determining a quantitative dispersion image (QDI) of the object comprises calculating, for each pixel of the quantitative dispersion image (QDI), a quantitative dispersion value based on the respective refractive indices (n) of the different illumination light wavelengths.

(7) The method of anyone of (1) to (6) wherein the set of quantitative phase images (QPI) comprises three quantitative phase images, wherein each of the three phase images having been obtained with one of three different illumination light wavelengths ($\lambda_{short}$, $\lambda_{middle}$, $\lambda_{long}$) which are ordered as $\lambda_{long} > \lambda_{middle} > \lambda_{short}$, wherein $\lambda_{short}$ is the shortest wavelength of the three different wavelength, $\lambda_{middle}$ is the middle wavelength of the three different wavelength and $\lambda_{long}$ is the longest wavelength of the three different wavelength.

(8) The method of (7), wherein the determining a quantitative dispersion image (QDI) of the object comprises calculating, for each pixel of the quantitative dispersion image (QDI), a quantitative dispersion value (QDV), based on three refractive indices ($n_{short}$, $n_{middle}$, $n_{long}$) corresponding to the three different illumination light wavelengths ($\lambda_{short}$, $\lambda_{middle}$, $\lambda_{long}$)

$$QDV_{object} = \frac{n_{middle,object} - 1}{n_{short,object} - n_{long,object}}$$

wherein the first refractive index $n_{short}$ of three refractive indices ($n_{short}$, $n_{middle}$, $n_{long}$) corresponds to shortest illumination light wavelength $\lambda_{short}$, the second refractive index $n_{middle}$ of three refractive indices ($n_{short}$, $n_{middle}$, $n_{long}$) corresponds to middle illumination light wavelength $\lambda_{middle}$ and the third refractive index $n_{long}$ of three refractive indices ($n_{short}$, $n_{middle}$, $n_{long}$) corresponds to the longest illumination light wavelength $\lambda_{long}$.

(9) The method of anyone of (1) to (8), wherein a virtual staining of the object is based on the quantitative dispersion image (QDI) of the object (12).

(10) The method of (2) further comprising, determining a quantitative phase image (QPI) of the object for each three different illumination light wavelengths by applying a Gerchberg-Saxton algorithm to the respective one or more phase-shifted holograms of the object (12) for each three different illumination light wavelengths.

(11) The method of (7), wherein the three different illumination light wavelengths ($\lambda_{blue}$, $\lambda_{green}$, $\lambda_{red}$) are blue, green and red.

(12) The method of (11) further comprising, calculating, for each different illumination light wavelength ($\lambda_{blue}$, $\lambda_{green}$, $\lambda_{red}$) a respective amplitude image based on respective one or more phase-shifted holograms of the object (12), and reconstructing an RGB image of the object based on the amplitude images.

(13) The method of (12), wherein the virtual staining of the object (12) is based on the quantitative dispersion image (QDI) of the object and/or the RGB image of the object and/or the qualitative phase image (QPI) for each of the three different illumination light wavelengths ($\lambda_{blue}$, $\lambda_{green}$, $\lambda_{red}$).

(14) The method of anyone of (3) to (13), wherein the respective one or more phase-shifted holograms of the object (12) are acquired time sequentially for each of the different illumination light wavelengths and wherein the image sensor (14) is a monochrome image sensor.

(15) The method of anyone of (3) to (14), wherein the acquiring of two or more phase-shifted holograms of the object (12) comprises shifting the distance between the image sensor (14) and the object (12) to realize different phase shifts.

(16) The method of anyone of (3) to (15), wherein the acquiring of two or more phase-shifted holograms of the object (12) comprises tuning a tunable phase-shifter (20) which is, placed between the object (12) and the image sensor (14) to realize different phase shifts.

(17) The method of anyone of (3) to (16), wherein the acquiring of two or more phase-shifted holograms of the object (12) comprises inserting different swappable (30) elements with different refractive indices between the image sensor (14) and the object (12) to realize different phase shifts or comprises inserting different optical elements with different thickness between the image sensor (14) and the object (12) to realize different phase shifts.

(18) The method of anyone of (3) to (17), wherein the acquiring of two or more phase-shifted holograms of the object (12) comprises switching a polarizer (40) place on top of a a birefringent optical element (40)

which are placed between the object (12) and the image sensor (14) to realize different phase shifts.

(19) The method of anyone of (1) to (18), wherein the object (12) is a tissue specimen.

(20) An electronic device (1500) comprising circuitry configured to acquiring with at least three different illumination light wavelengths respectively one or more phase-shifted holograms of an object (12) at an image sensor (14).

(21) A digital in-line hologram microscope scanner comprising, an image sensor (14) configured to acquire, for each illumination light wavelength of a set of different illumination light wavelengths, respective two or more phase-shifted holograms of an object (12), wherein the distance between the object (12) and the image sensor (14) is fixed.

(22) The digital in-line hologram microscope scanner of (21) further comprising, a tunable phase-shifter (30) placed between the image sensor (14) and the object (12), configured to adjust the phase of emitted light, for acquiring the two or more phase-shifted holograms of the object (12).

(23) The digital in-line hologram microscope scanner of (21) to (22) further comprising, different swappable optical elements (30) with different refractive indices placeable between the image sensor (14) and the object (12), for acquiring two or more phase-shifted holograms of the object (12) or different optical elements with different thickness between the image sensor (14) and the object (12) to realize different phase shifts for acquiring two or more phase-shifted holograms of the object (12).

(24) The digital in-line hologram microscope scanner of (21) to (23) further comprising, a switchable polarizer (40) and a birefringent optical element (40) placed between the image sensor (14) and the object (12), configured to switch the polarizer for acquiring two or more phase-shifted holograms of the object (12).

The invention claimed is:

1. A method comprising:

determining a quantitative dispersion image of an object based on a set of quantitative phase images, each quantitative phase image of the set of quantitative phase images having been obtained with a respective different illumination light wavelength, wherein the set of quantitative phase images comprises three quantitative phase images, wherein each of the three phase images having been obtained with one of three different illumination light wavelengths which are ordered as, wherein $\lambda_{short}$ is the shortest wavelength of the three different wavelengths, $\lambda_{middle}$ is the middle wavelength of the three different wavelengths and $\Delta_{long}$ is the longest wavelength of the three different wavelengths.

2. The method of claim 1 further comprising, calculating, for each different illumination light wavelength, the respective phase image based on respective one or more phase-shifted holograms of the object.

3. The method of claim 2 further comprising, determining a quantitative phase image of the object for each three different illumination light wavelengths by applying a Gerchberg-Saxton algorithm to the respective one or more phase-shifted holograms of the object for each three different illumination light wavelengths.

4. The method of claim 1 further comprising, acquiring, for each different illumination light wavelength, respectively one or more phase-shifted holograms of the object at an image sensor.

5. The method of claim 4, wherein the respective one or more phase-shifted holograms of the object are acquired time sequentially for each of the different illumination light wavelengths and wherein the image sensor is a monochrome image sensor.

6. The method of claim 4, wherein the acquiring of two or more phase-shifted holograms of the object comprises shifting the distance between the image sensor and the object to realize different phase shifts.

7. The method of claim 4, wherein the acquiring of two or more phase-shifted holograms of the object comprises tuning a tunable phase-shifter which is placed between the object and the image sensor to realize different phase shifts.

8. The method of claim 4, wherein the acquiring of two or more phase-shifted holograms of the object comprises inserting different swappable elements with different refractive indices between the image sensor and the object to realize different phase shifts or comprises inserting different optical elements with different thickness between the image sensor and the object to realize different phase shifts.

9. The method of claim 4, wherein the acquiring of two or more phase-shifted holograms of the object comprises switching a polarizer placed on top of a birefringent optical element which are placed between the object and the image sensor to realize different phase shifts.

10. The method of claim 1, wherein the determining the quantitative dispersion image of the object comprises calculating, for each of different illumination light wavelengths and for each pixel of the quantitative dispersion image, an optical path difference based on a phase delay value of a respective pixel of the respective quantitative phase image.

11. The method of claim 10, wherein the determining a quantitative dispersion image of the object comprises calculating, for each of different illumination light wavelengths and for each pixel of the quantitative dispersion image, a refractive index based on a predetermined refractive index of a reference medium and the optical path difference of a respective pixel of the respective quantitative phase image.

12. The method of claim 11, wherein the determining a quantitative dispersion image of the object comprises calculating, for each pixel of the quantitative dispersion image, a quantitative dispersion value based on the respective refractive indices of the different illumination light wavelengths.

13. The method of claim 1, wherein the determining a quantitative dispersion image of the object comprises calculating, for each pixel of the quantitative dispersion image, a quantitative dispersion value, based on three refractive indices corresponding to the three different illumination light wavelengths $$QDV_{object} = \frac{n_{middle,object} - 1}{n_{short,object} - n_{long,object}}$$

wherein the first refractive index $n_{short}$ of three refractive indices $n_{short}$, $n_{middle}$, $n_{long}$ corresponds to shortest illumination light wavelength $\lambda$short, the second refractive index $n_{middle}$ of three refractive indices $n_{short}$, $n_{middle}$, $n_{long}$ corresponds to middle illumination light wavelength $\lambda_{middle}$ and the third refractive index $n_{long}$ of three refractive indices $n_{short}$, $n_{middle}$, $n_{long}$ corresponds to the longest illumination light wavelength $\Delta_{long}$.

14. The method of claim 1, wherein a virtual staining of the object is based on the quantitative dispersion image of the object.

15. The method of claim 1, wherein the three different illumination light wavelengths are blue, green and red.

16. The method of claim 15 further comprising, calculating, for each different illumination light wavelength, a respective amplitude image based on respective one or more phase-shifted holograms of the object, and reconstructing an RGB image of the object based on the amplitude images.

17. The method of claim 16, wherein the virtual staining of the object is based on the quantitative dispersion image of the object and/or the RGB image of the object and/or the qualitative phase image for each of the three different illumination light wavelengths.

18. The method of claim 1, wherein the object is a tissue specimen.

19. An electronic device comprising circuitry configured to:

determine a quantitative dispersion image of an object based on a set of quantitative phase images, each quantitative phase image of the set of quantitative phase images having been obtained with at least three different illumination light wavelengths which are ordered as, wherein $\lambda_{short}$ is the shortest wavelength of the three different wavelengths, $\lambda_{middle}$ is the middle wavelength of the three different wavelengths and $\lambda_{long}$ is the longest wavelength of the three different wavelengths.

20. A digital in-line hologram microscope scanner comprising:

an image sensor configured to acquire, for each illumination light wavelength of a set of different illumination light wavelengths, respective two or more phase-shifted holograms of an object, wherein the distance between the object and the image sensor is fixed; and circuitry configured to;

determine a set of quantitative phase images from the acquired phase-shifted holograms; and calculate, for each of different illumination light wavelengths and for each pixel of the quantitative dispersion image, an optical path difference based on a phase delay value of a respective pixel of the respective quantitative phase image.

21. The digital in-line hologram microscope scanner of claim 20 further comprising, a tunable phase-shifter placed between the image sensor and the object, configured to adjust the phase of emitted light, for acquiring the two or more phase-shifted holograms of the object.

22. The digital in-line hologram microscope scanner of claim 20 further comprising, different swappable optical elements with different refractive indices placeable between the image sensor and the object, for acquiring two or more phase-shifted holograms of the object or different optical elements with different thickness between the image sensor and the object to realize different phase shifts for acquiring two or more phase-shifted holograms of the object.

23. The digital in-line hologram microscope scanner of claim 20 further comprising, a switchable polarizer and a birefringent optical element placed between the image sensor and the object, configured to switch the polarizer for acquiring two or more phase-shifted holograms of the object.

24. The digital in-line hologram microscope scanner of claim 20, wherein the set of quantitative phase images comprises three quantitative phase images, wherein each of the three phase images having been obtained with one of three different illumination light wavelengths which are ordered as, wherein $\lambda_{short}$ is the shortest wavelength of the three different wavelengths, $\lambda_{middle}$ is the middle wavelength of the three different wavelengths and $\lambda_{long}$ is the longest wavelength of the three different wavelengths.

\* \* \* \* \*